(12) United States Patent
Furuya et al.

(10) Patent No.: US 8,254,421 B1
(45) Date of Patent: Aug. 28, 2012

(54) WAVELENGTH CONVERSION LASER LIGHT SOURCE, AND LASER LIGHT SOURCE DEVICE AND TWO-DIMENSIONAL IMAGE DISPLAY DEVICE ADOPTING THE SAME

(75) Inventors: Hiroyuki Furuya, Osaka (JP); Tetsuro Mizushima, Hyogo (JP); Koichi Kusukame, Osaka (JP); Kenji Nakayama, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 775 days.

(21) Appl. No.: 12/354,444

(22) Filed: Jan. 15, 2009

(30) Foreign Application Priority Data

Jan. 16, 2008 (JP) ................................ 2008-006574

(51) Int. Cl.
*H01S 3/04* (2006.01)
(52) U.S. Cl. ............... 372/34; 372/21; 372/22; 359/328
(58) Field of Classification Search .................... 372/21, 372/22, 34; 359/328
See application file for complete search history.

(56) References Cited

U.S. PATENT DOCUMENTS

| | | | | |
|---|---|---|---|---|
| 5,483,374 | A * | 1/1996 | Tanuma | 359/328 |
| 6,240,113 | B1 * | 5/2001 | Peterson | 372/36 |
| 7,526,009 | B2 * | 4/2009 | Lee | 372/70 |
| 2006/0124631 | A1 * | 6/2006 | Alfredeen | 219/635 |

FOREIGN PATENT DOCUMENTS

| | | |
|---|---|---|
| JP | 2007-73552 | 3/2007 |
| JP | 2007-516600 | 6/2007 |

* cited by examiner

*Primary Examiner* — Tod T Van Roy
(74) *Attorney, Agent, or Firm* — Wenderoth, Lind & Ponack, L.L.P.

(57) ABSTRACT

A wavelength conversion laser light source includes a fundamental wave laser light source; a wavelength conversion element for converting a fundamental wave emitted from the fundamental wave laser light source into a harmonic wave; and an element temperature holding section for holding the wavelength conversion element at a temperature as set, wherein the element temperature holding section includes a magnetic metal formed on at least a part of the surface of the wavelength conversion element via an insulating material, and a magnetic flux application section for heating the magnetic metal with an application of a magnetic flux to the magnetic metal.

7 Claims, 19 Drawing Sheets

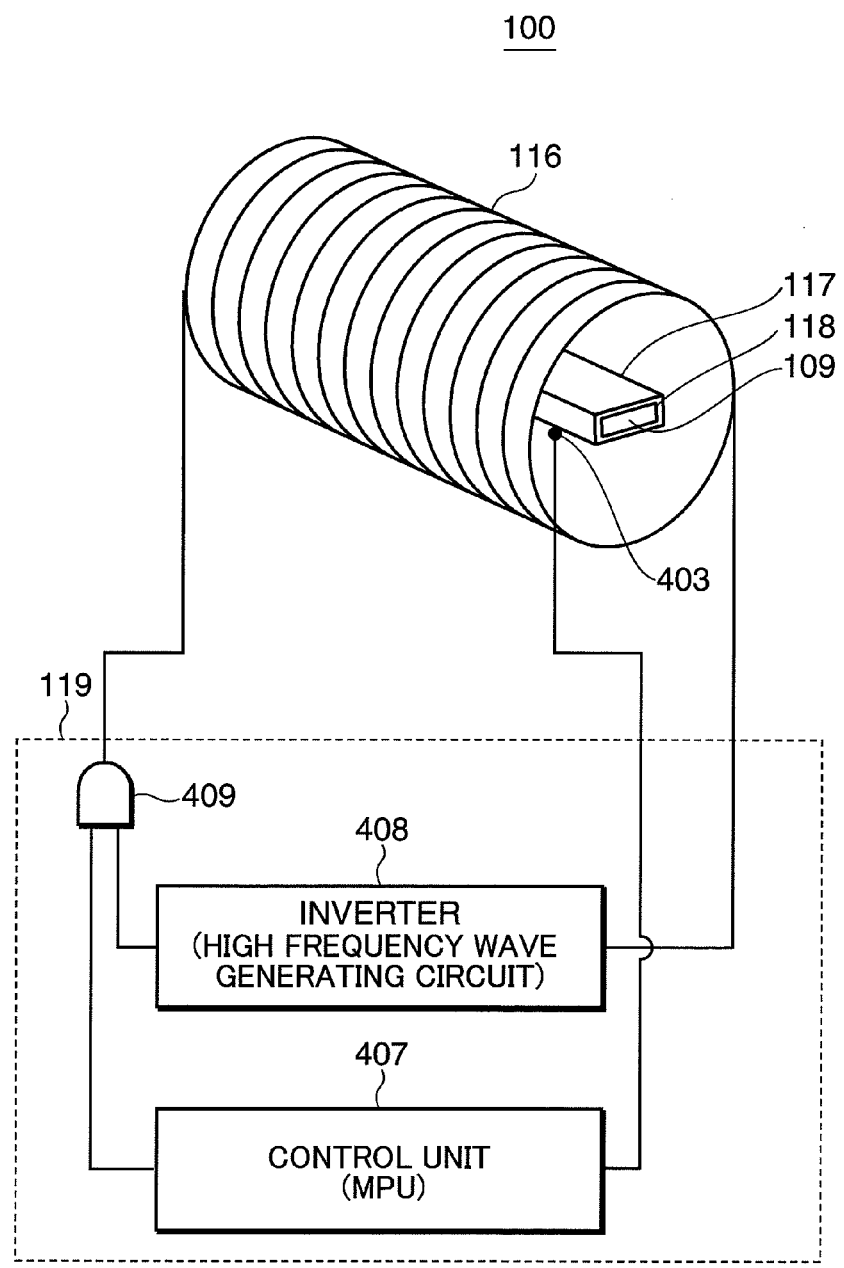

FIG. 7A

| | INSULATING CONDITION EACH n=10 | RESISTIVITY ($\Omega \cdot cm$) | BASIC WAVE TRANSMITTANCE AFTER 100 CYCLES | RESULT |
|---|---|---|---|---|
| 1 | CONDUCTIVE COAT MATERIAL | $5 \times 10^{-5}$ | DROP BY 4% | × |
| 2 | COAT MATERIAL A | $1 \times 10^{8}$ | DROP BY 1% | △ |
| 3 | COAT MATERIAL B | $2 \times 10^{11}$ | UNCHANGED | ○ |
| 4 | SiO2 SPUTTERING FILM | — | DROP BY 3% | × |
| 5 | SiO2 CVD FILM | — | UNCHANGED | ○ |
| 6 | ELEMENT MONOMER (REFERENCE) | — | UNCHANGED (TESTED BY TEST INSTRUMENT) | ○ |

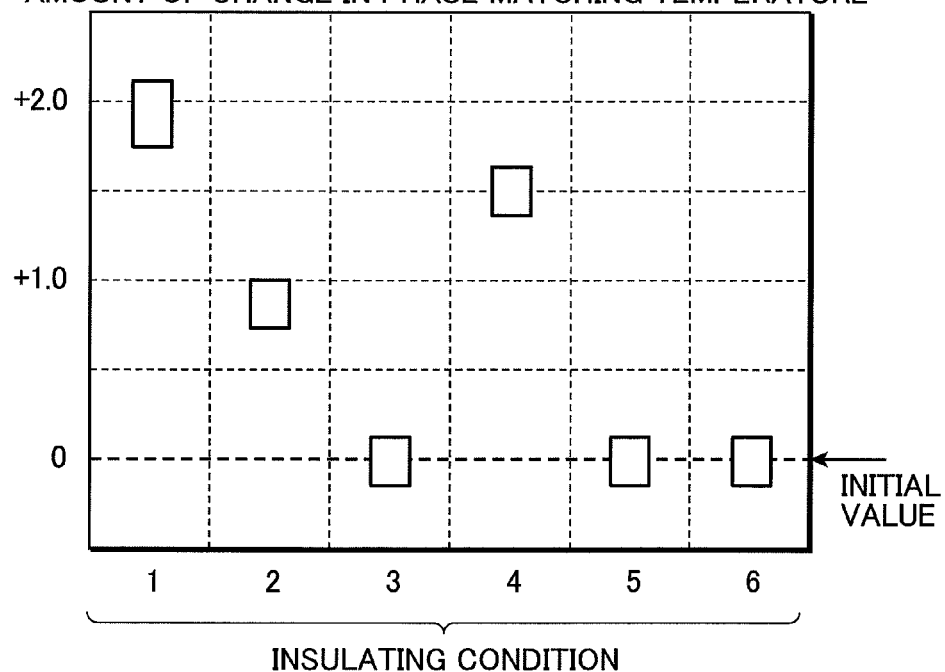

FIG. 7B

AMOUNT OF CHANGE IN PHASE MATCHING TEMPERATURE

INSULATING CONDITION

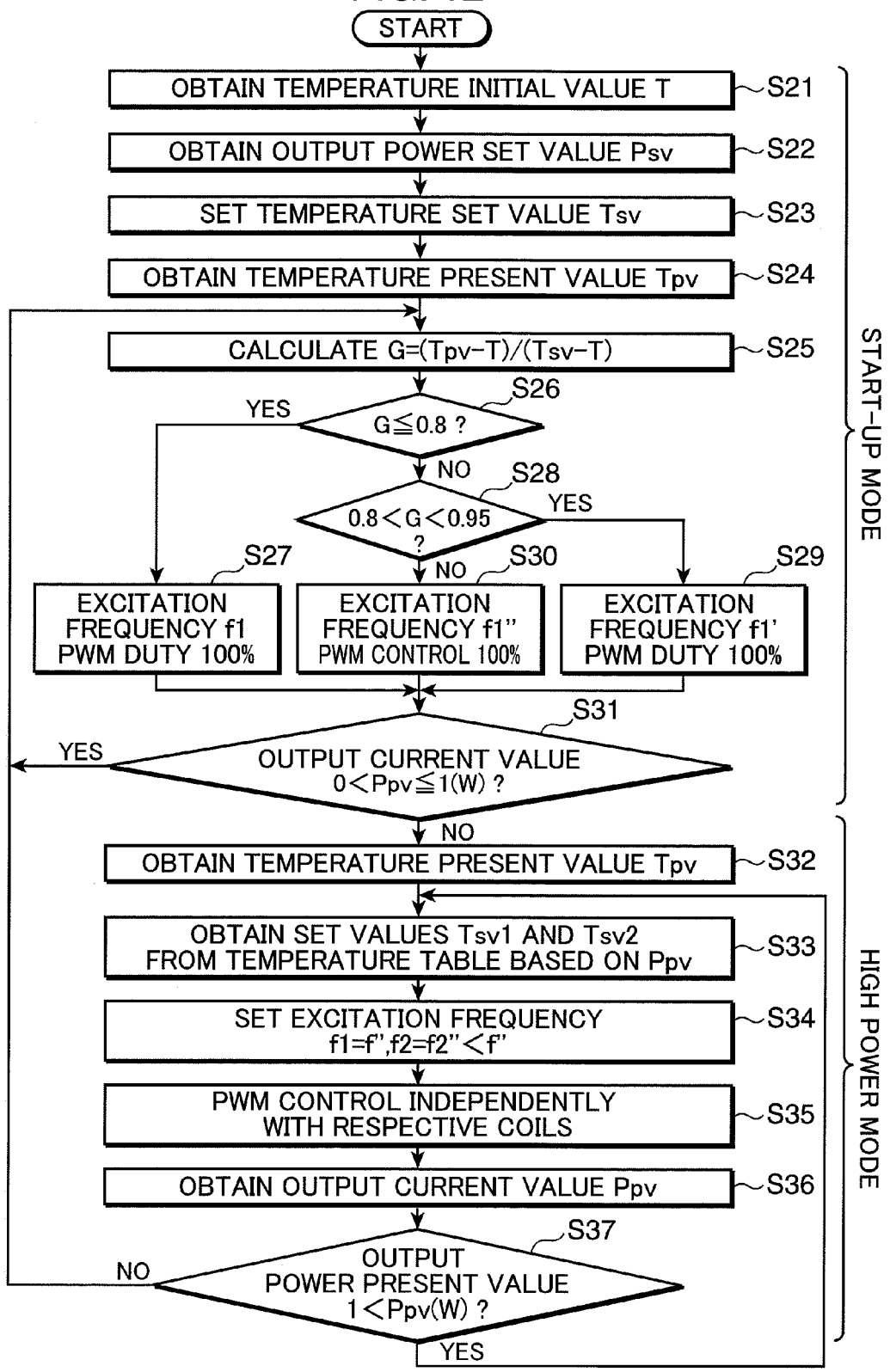

WAVELENGTH CONVERSION LASER LIGHT SOURCE, AND LASER LIGHT SOURCE DEVICE AND TWO-DIMENSIONAL IMAGE DISPLAY DEVICE ADOPTING THE SAME

This application is based on Japanese patent application serial No. 2008-006574, filed in Japan Patent Office on Jan. 16, 2008, the contents of which are hereby incorporated by reference.

BACKGROUND OF THE INVENTION

1. Field of the Invention

The preset invention relates to a wavelength conversion laser light source for converting a laser beam emitted from a laser light source using the non-linear optical effects, and also to a laser light source device and a two-dimensional image display device adopting the same.

2. Description of the Background Art

Conventionally, a variety of wavelength conversion laser light sources have been developed and made into practical applications, wherein a visible laser beam is obtained, such as a green light or an ultraviolet ray which is obtained by further converting the green light, etc., through the wavelength conversion using the non-linear optical effects of a laser beam emitted from the Nd:YAG laser, or the Nd:YVO$_4$ laser. These converted light beams are used for laser processing, or a laser display, etc.

FIG. 2 shows a typical structure of a conventional wavelength conversion laser light source using the non-linear optical effect. In order to obtain the non-linear optical effect, it is required to adopt the non-linear optical crystals having the birefringence. Examples of such non-linear optical crystals having the birefringence include: LiB$_3$O$_5$ (LBO: lithium triborate), KTiOPO$_4$ (KTP: Potassium Titanyl Phosphate), CsLiB$_6$O$_{10}$ (CLBO: Cesium Lithium Borate); or LiNbO$_3$ (PPLN: Lithium Tantalate), and LiTaO$_3$ (PPLT: Lithium Tantalate) having a periodical polarization inversion structure, etc.

As shown in FIG. 2, a wavelength conversion laser light source 200 includes a fundamental wave light source 101, a collective lens 108, a non-linear optical crystals (wavelength conversion element) 109, a re-collimating lens 111, a wavelength-dividing mirror, a temperature holder 201 such as a heater or the like for holding the temperature of the non-linear optical crystals constant, a power supply 114, a control unit 225 for controlling a laser output, and a temperature controller (not shown) provided in the control unit 225 for controlling the temperature of the non-linear optical crystals. For the fundamental wave light source 101, Nd:YAG laser, Nd:YVO$_4$ laser, fiber laser using Yb doped fiber having a wavelength of 1.06 μm are generally used.

Here, the actual operations will be explained, which generate the second harmonic wave having a wavelength of 0.532 μm, which is around ½ of wavelength (1.06 μm) of the fundamental wave.

The laser beam having a wavelength of 1.06 μm as emitted from the fundamental wave light source 101 is converged into the non-linear optical crystals 109 by the collective lens 108. Here, the non-linear optical crystals 109 needs to have the refractive index for the light having the wavelength of 1.06 μm matched with the refractive index for the light having the wavelength of 0.532 μm to be generated (phase matching condition). Generally, the refractive index for the crystals varies according to temperature conditions of the crystals. Therefore, the temperature of the crystals needs to be maintained constant. For this reasons, the non-linear optical crystals are placed in the temperature holder 201, and are maintained at a predetermined temperature suited for the kind of the crystals. For example, when adopting the LBO crystals, in order to obtain the type-1 non-critical phase matching (the phase matching state), the LBO crystals need to be maintained at a temperature in a range of from 148° C. to 150° C. as disclosed in Japanese Unexamined Patent Publication No. 2007-516600.

On the other hand, when adopting LiNbO$_3$ crystals having a periodical polarization inversion structure, it is possible to set the temperature and the wavelength for the phase matching condition by selecting the period for the periodical polarization inversion structure. In this case, however, it is necessary to keep the temperature and the fundamental harmonic wavelength of non-linear optical crystal 109 constant in order to maintain the phase matching condition as disclosed in Japanese Unexamined Patent Publication No. 2007-73552.

However, it has been found that for some kinds of the non-linear optical crystals to be adopted as the wavelength conversion element, the temperature of the element is raised by absorbing the fundamental wave and the harmonic wave as generated, which makes the phase matching temperature (wavelength) vary according to the output level of the harmonic wave, thereby presenting a problem in that a high conversion efficiency cannot be realized.

For the temperature holder 201, a Peltier device or a heater is used conventionally. However, when adopting such temperature holder 201, it takes minute order time for the non-linear optical crystal 109 to arrive to the target temperature after starting the wavelength conversion laser source. Therefore, there is a problem that the wavelength conversion laser source that has temperature holder 201 with a Peltier device or a heater is unsuitable for the usage of the optical source for the display from which lighting is demanded momentarily etc.

When the temperature control is performed by using the Peltier device as the temperature holder 201 at the temperature in vicinity of the room temperature (20° C.-30° C.), it is possible to shorten the start-up time to some degree, and to shorten the time of arrival to the target temperature. However, when the room temperature is higher than the holding temperature of non-linear optical crystal 109 and humidity is high, a problem arises in that dew condensation is generated on the surface of the non-linear optical crystal.

Even when a rapid start-up is to be performed by adopting the temperature holder 201 with a mass heater, some time is still required to stabilize the temperature of non-linear optical crystal 109. Moreover, there is a problem in respect of the reliability as the non-linear optical crystal 109 may be damaged due to thermal stress.

SUMMARY OF THE INVENTION

An object of the present invention is to provide a wavelength conversion laser light source, and a laser light source device and a two-dimensional image display device adopting the same, which realize a shorter stat-up time required for a wavelength conversion element to arrive to a target temperature.

A wavelength conversion laser light source, according to one aspect of the present invention includes: a fundamental wave laser light source; a wavelength conversion element for converting a fundamental wave emitted from the fundamental wave laser light source into a harmonic wave; and an element temperature holding section for holding the wavelength conversion element at a temperature as set, wherein the element temperature holding section includes a magnetic metal formed on at least a part of the surface of the wavelength conversion element via an insulating material, and a magnetic flux application section for heating the magnetic metal with an application of a magnetic flux to the magnetic metal.

According to the foregoing structure, the magnetic metal is formed on the surface of the wavelength conversion element. With this structure, by applying a magnetic flux from the magnetic flux application section onto the magnetic metal, eddy current is generated on the surface of the magnetic metal by the electromagnetic induction. As a result, the magnetic metal serves as a heat source, and it becomes possible to rapidly heat the wavelength conversion element. Namely, according to the wavelength conversion laser light source of the present invention realizes a rapid temperature rise of the wavelength conversion element by adopting the induction heating method as compared to the conventional structure adopting a heater or a Peltier device. As a result, the time required for the wavelength conversion element to arrive to the target temperature can be reduced, which in turn realizes a rapid start up of the wavelength conversion laser light source. Furthermore, the insulating material is provided between the wavelength conversion element and the magnetic metal so that the magnetic metal does not directly contact the surface of the wavelength conversion element. With this structure, it is possible to suppress the absorption of the fundamental wave, thereby improving the transmittance of the fundamental wave.

These and other objects, features and advantages of the present invention will become more apparent upon reading the following detailed description along with the accompanying drawings.

BRIEF DESCRIPTION OF THE DRAWINGS

FIG. 3 is an explanatory view showing the relative position between the non-linear optical crystal (wavelength conversion element) and the pump coil, the connected state between the pump coil and he high frequency power supply in accordance with one embodiment of the present invention;

FIG. 7A is an explanatory view showing the relation between the base material when the magnetic metal is deposited to the non-linear optical crystal, and the fundamental wave transmission of the non-linear optical crystal after the temperature cycling test (100 cycles) in a temperature range of 0° C. to 80° C.;

FIG. 7B is an explanatory view showing the relation between respective conditions of the base material of FIG. 7A, and changes in phase matching temperature after the temperature cycling test;

FIG. 12 is a flowchart showing a control operation by a temperature controller of FIG. 11;

DETAILED DESCRIPTION OF THE PREFERRED EMBODIMENTS OF THE INVENTION

Hereinafter, embodiments of the present invention will be described with reference to the drawings.

In the first through third embodiments, a method of obtaining the temperature of the wavelength conversion element and setting the element temperature at a predetermined temperature value will be explained. In the fourth embodiment, a method of determining a timing of re-setting the temperature of the wavelength conversion element at an optimal temperature in consideration of changes in temperature of the wavelength conversion element as time passes, and a method of making fine adjustments on the temperature of the wavelength conversion element.

First Embodiment

Figure 1:
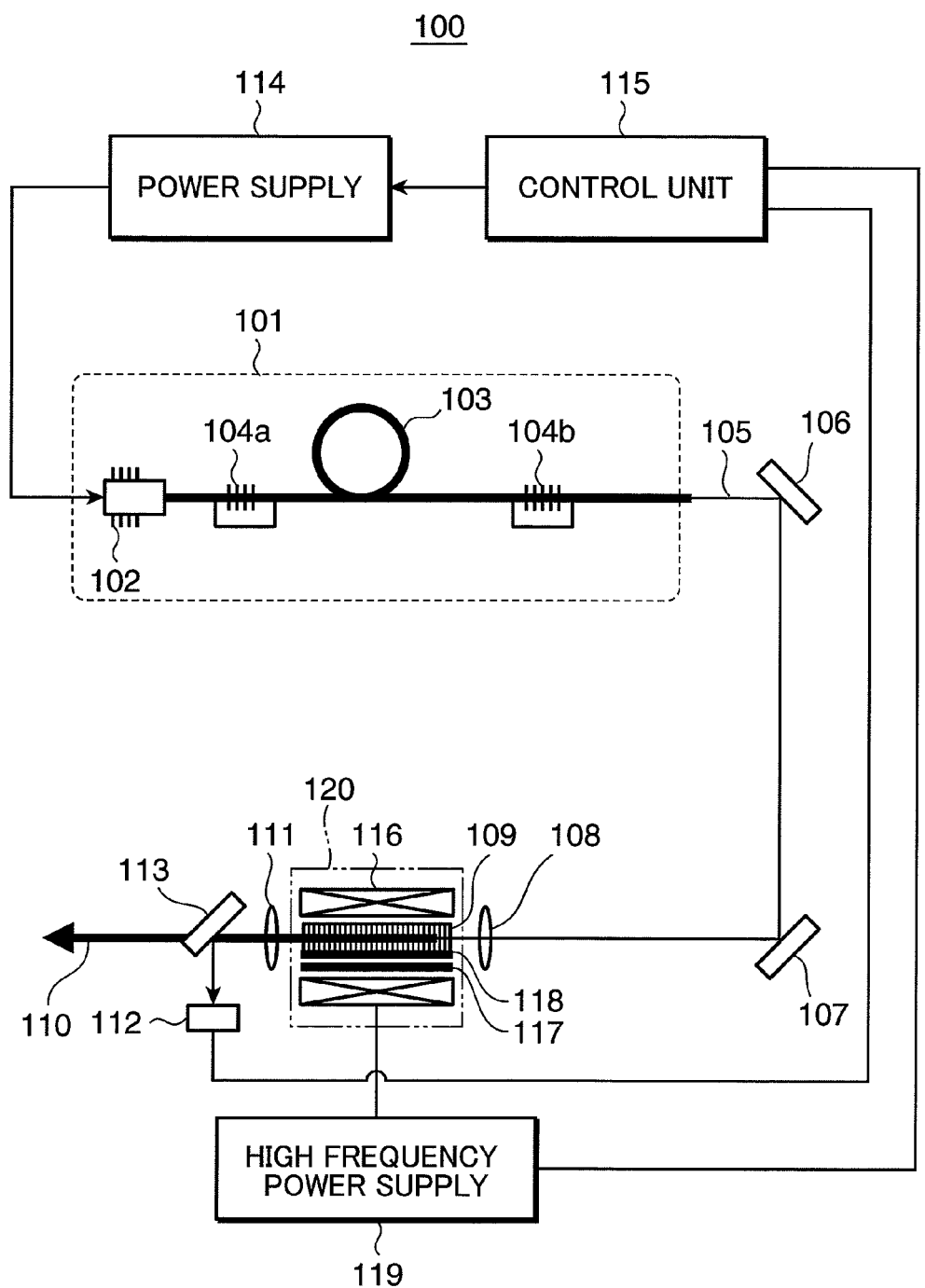
FIG. 1 is an explanatory view schematically showing the structure of a wavelength conversion laser light source in accordance with one embodiment of the present invention.
Figure 2:
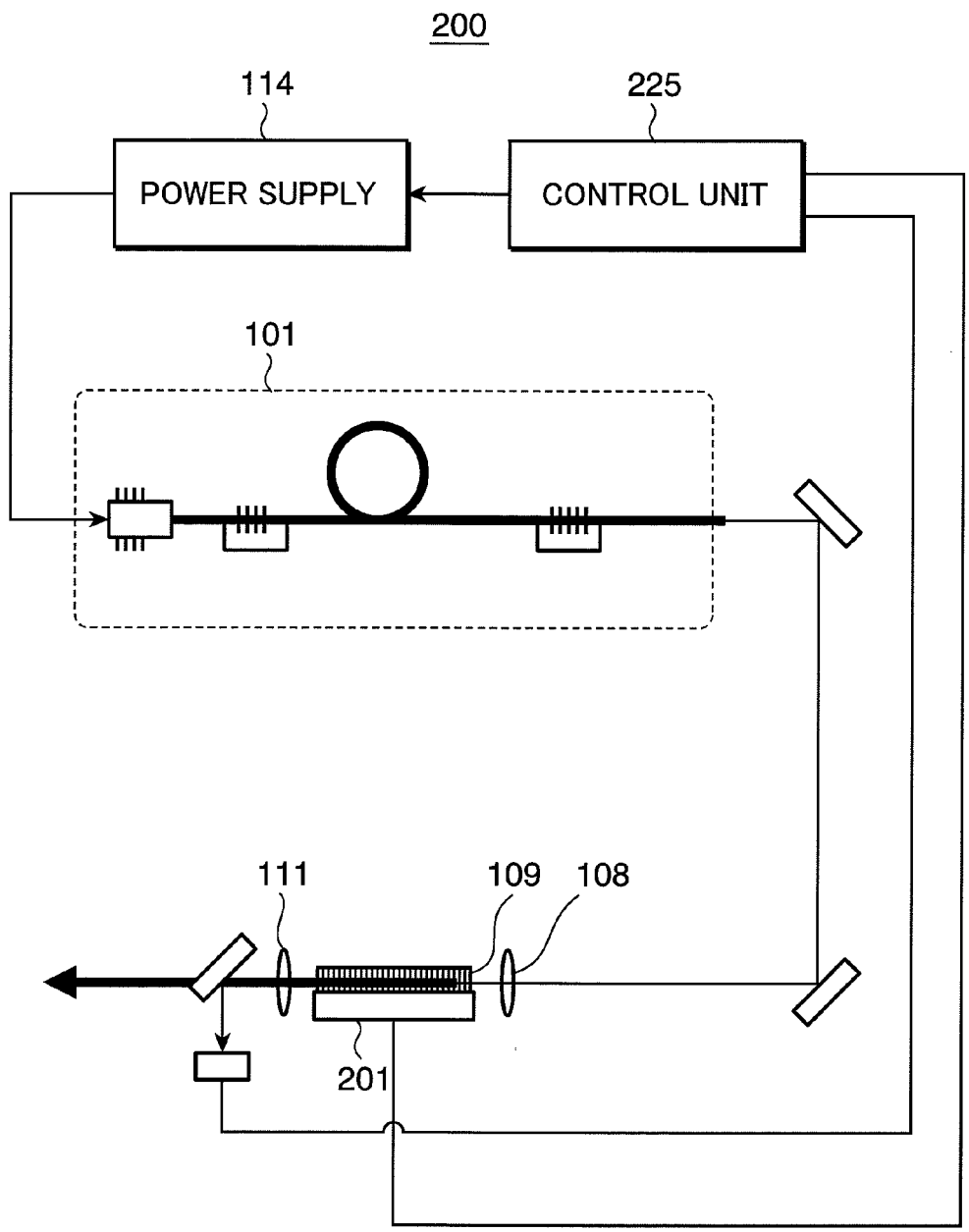
FIG. 2 is an explanatory view schematically showing the structure of a conventional wavelength conversion laser light source.

FIG. 1 shows wavelength conversion laser source 100 according to the present embodiment. In the present embodiment, the non-linear optical crystal 109 (wavelength conversion element) is provided within the pump coil 116 (magnetic flux applying section). The wavelength conversion laser source 100 includes a fundamental wave light source 101, condensing lens 108, a non-linear optical crystal 109, a re-collimating lens 111, a photodetector 112 (photodiode), a beam splitter 113, a power supply 114, a control unit 115, a pump coil 116, a magnetic metal 117, a insulating material 118, and a high frequency power supply 119, etc.

First of all, the structure of the fundamental wave light source 101 is explained. The fiber laser optical source that uses Yb-dope fiber 103 is used as the fundamental wave light source 101. The fiber laser optical source has an advantage in that the emission wavelength and the spectral band width can be set arbitrarily. The fundamental wave light source 101 includes the pump LD 102. The power output of the wavelength converted laser beam is controlled by the electric current supplied from the power supply 114 to the pump LD 102 of the fundamental wave light source 101.

The fundamental wave 105 generated from the fundamental wave light source 101 (fiber laser light source) is led to the collective lens 108 by the first dichroic mirror 106 and the second dichroic mirror 107. The fundamental wave 105 is then condensed to the non-linear optical crystal 109 by the collective lens 108.

For the non-linear optical crystal 109 as the wavelength conversion element, $LiNbO_3$ or $LiTaO_3$ having a periodical polarization inversion structure or a crystal of $LiNbO_3$ or $LiTaO_3$ having added thereto MgO, or the like. In the present embodiment, $MgO:LiNbO_3$ crystal element (MgLN element) is adopted as the non-linear optical crystals, wherein the periodical polarization inversion structure is formed.

The second harmonic wave 110 wavelength converted by the non-linear optical crystal 109 is formed into a parallel beam by the re-collimating lens 111. Then, it is separated into the fundamental wave that remains without being converted and the harmonic wave by the beam splitter 113 (wavelength plutonium separation mirror).

The magnetic metal 117 is deposited on the surface of the non-linear optical crystal 109 (MgLN element) via the insulating material 118. For the magnetic metal 117, for example, tantalum may be used. With this structure, by applying the magnetic field of high frequency from the outside of the non-linear optical crystal 109, eddy current will be caused on the surface of magnetic metal 117. As a result, the magnetic metal 117 serves as a heat source, and it becomes possible to control the temperature of the non-linear optical crystal 109 by adjusting the applied high-frequency field. Namely, in the present embodiment, as the means for maintaining the temperature of the non-linear optical crystal 109 constant, the magnetic metal 117 deposited to the surface of non-linear optical crystal 109 via the insulating material 118 is made to generate heat by the high frequency induction heating. By adopting the foregoing structure of generating heat by the high frequency induction heating, a steep temperature rise can be realized.

In the present embodiment, the pump coil 116 that applies the high-frequency field to the non-linear optical crystal 109 is provided so as to surround the non-linear optical crystal 109. Namely, as shown in FIG. 3, the pump coil 116 surrounds the non-linear optical crystal 109 and the non-linear optical crystal 109 is provided in the pump coil 116. The temperature controller of the present embodiment controls the temperature of the non-linear optical crystal 109 by switching ON/OFF the high frequency signal from high frequency power supply 119, while changing the depth of penetration of the eddy current generated on the surface of magnetic metal 117 by changing the frequency of the high frequency signal, thereby controlling the slope of the rate of temperature rise of the non-linear optical crystal 109.

Figure 4A:
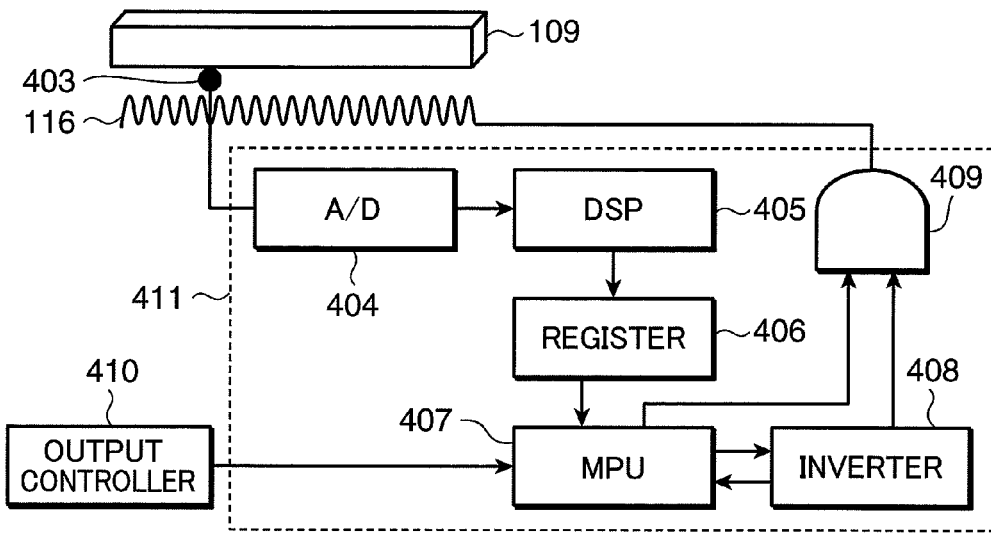
FIG. 4A is a block diagram showing schematic structures of a temperature controller in accordance with one embodiment of the present invention.

FIG. 4A shows the block diagram of the temperature controller 411 in accordance with the present embodiment. The temperature controller 411 includes an A/D converter 404, a DSP (Digital Signal Processor) 405, a register 406, an MPU 407, an inverter circuit 408, and a switching circuit 409. The temperature of the non-linear optical crystal 109 is monitored by the thermistor 403 that is the temperature sensor. The temperature detection result by the thermistor 403 is converted into the digital value with A/D converter 404. In this case, the noise of the frequency band to which the pump coil 116 is driven by the DSP 405 (filter) is cut. The value of the temperature is temporarily stored in the register 406 at the time of being acquired, and the difference with the desired value is operated with the MPU 407. When the difference between the preset value of the temperature and the target value is large, the MPU 407 instructs the inverter circuit 408 where the high frequency signal is generated, to excite the pump coil 116 with a higher frequency. The MPU 407 then reduces the frequency that excites pump coil 116 as the preset value of the temperature approaches the target value. In the meantime, the temperature of the non-linear optical crystal 109 is stabilized at the temperature in the vicinity of the target temperature by switching ON/OFF the signal output to the pump coil 116 by the switching circuit 409 to carry out the PWM (Pulse Width Modulation) control.

In the present embodiment, the frequency that excites the pump coil 116 can be changed in the range of 10 kHz-100 kHz. The variable range of the excitation frequency is not limited to the above range, and can be set arbitrarily according to the conditions of use.

Figure 4B:
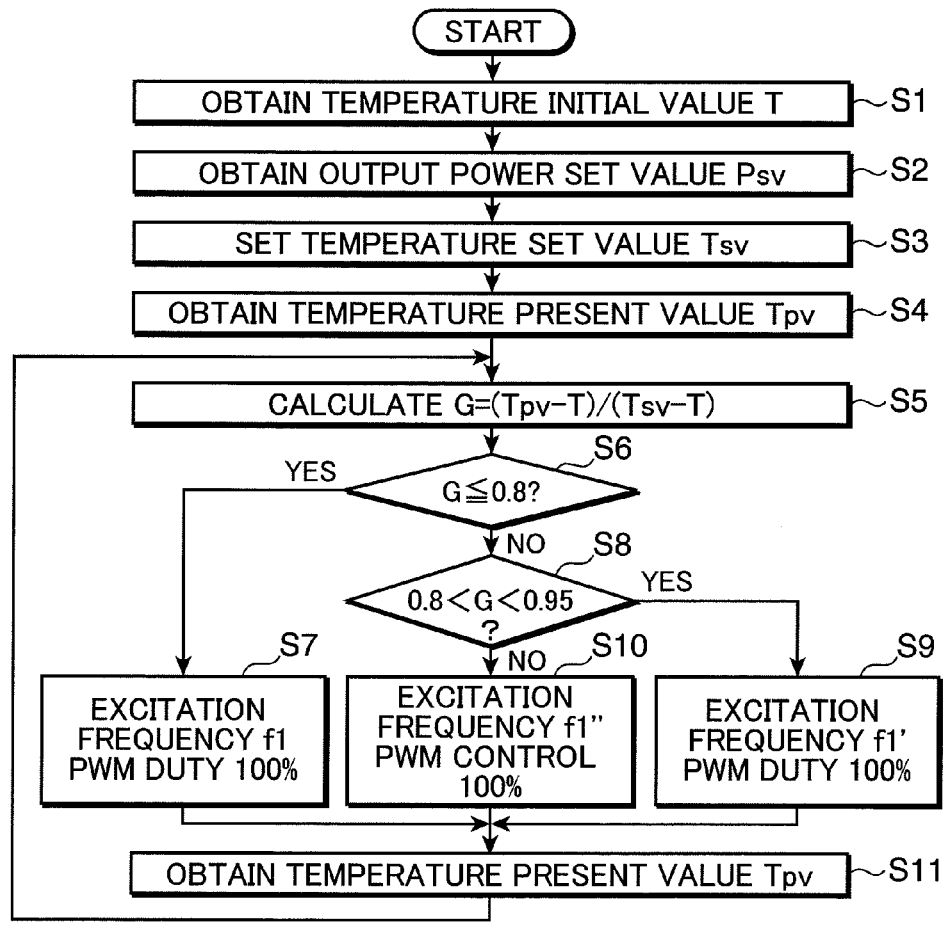
FIG. 4B is a flowchart showing a control operation by a temperature controller in accordance with one embodiment of the present invention.

FIG. 4B shows the control flow in the case of adopting the temperature retention mechanism of the non-linear optical crystal 109 according to the present embodiment. Upon starting the control flow, the temperature controller 411 obtains the temperature initial value T of the non-linear optical crystal 109 detected by the thermistor 403 (temperature sensor) (S1). Next, the temperature controller 411 obtains the output power set value Psv of the wavelength conversion laser source 100 from the power output controller 410 (S2), and sets the temperature set value Tsv corresponding to the output power set value Psv (S3). The temperature table that records the relation between the output power set value Psv and the temperature set value Tsv is stored in the register 406, and the temperature set value Tsv corresponding to the output power set value Psv is set referring to the temperature table.

Thereafter, the temperature controller 411 obtains the temperature present value Tpv of the non-linear optical crystal 109 detected by the thermistor 403 (S4), and the coefficient G shown in the equation (1) is calculated by using the temperature initial value T, the temperature preset value Tsv, and the temperature present value Tpv (S5).

$$G=(Tpv-T)/(Tsv-T) \quad (1)$$

The temperature controller 411 determines the duty of the PWM waveform of the high frequency signal, and the frequency of the high frequency signal (high-frequency current) supplied to the pump coil 116 according to the above-mentioned coefficient G. Namely, the excitation frequency of the high frequency signal is set to f1, and the duty ratio of the high frequency signal is set to 100% when the coefficient G falls in the range of G≦0.8 (YES in S6) (S7). The excitation frequency of the high frequency signal is set to f1', and the duty ratio of the high frequency signal is set to 100% when the coefficient G falls in the range of 0.8<G<0.95 (NO in S6, and YES in S8) (S9). On the other hand, when the coefficient G falls in the range of 0.95≦G (NO in S6, and NO in S8), the excitation frequency of the high frequency signal is set to f1", and the duty ratio of the high frequency signal is adjusted to perform the PWM control (S10). As a result, it is controlled so that G does not exceed 1.2.

Here, the excitation frequency is set so as to satisfy the condition of f1>f1'>f1", and it is set so that an amount of heat generated from the non-linear optical crystal 109 becomes smaller as the temperature approaches the target temperature without changing the present value. The temperature controller 411 obtains the temperature present value Tpv again (S11), and the sequence goes back to S5 to calculate the coefficient G shown in the above equation (1), and then perform the loop control by repeating the forgoing steps of S5 to S11.

On the other hand, the target temperature should be changed by the influence of optical absorption etc. in the non-linear optical crystal 109 for the setting of the target temperature (temperature set value Tsv) as the harmonic wave power output becomes larger. In response, the MPU 407 changes the target temperature at any time by receiving an instruction from the output controller 410 of the laser, and controls the saturation of the harmonic wave power output.

The temperature of the beam path of the fundamental wave laser beam that passes the non-linear optical crystal 109 rises locally as it approaches the output end of the non-linear optical crystal 109 when the wavelength is converted by using the non-linear optical crystal 109. The temperature distribution in the beam path in the element of this non-linear optical crystal 109 is generated since the non-linear optical crystal 109 absorbs the wavelength converted light (harmonic wave).

Figure 5:
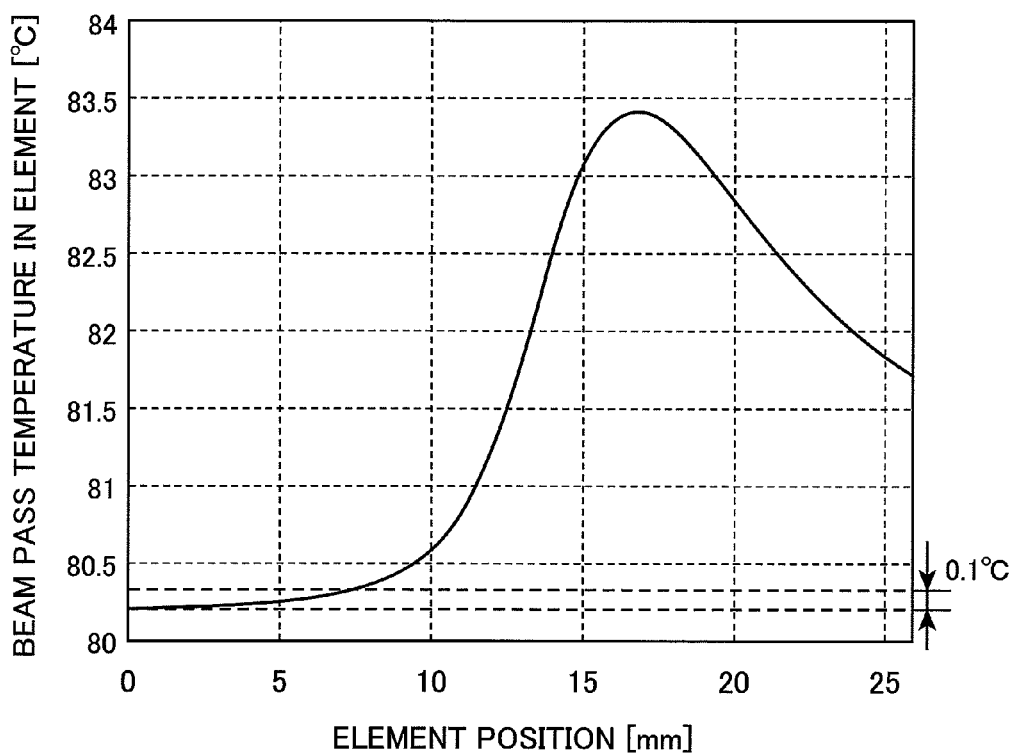
FIG. 5 is a graph showing the temperature distribution of the non-linear optical crystal when generating the green light of around 2.3 W using MgO:LiNbO$_3$ crystal that has the periodical polarization inversion structure as the non-linear optical crystal.

FIG. 5 shows the temperature distribution of the non-linear optical crystal 109 when generating the green light of around 2.3 W using MgO:LiNbO$_3$ crystal that has the periodical polarization inversion structure as the non-linear optical crystal 109. It can be seen from FIG. 5 that the temperature rises rapidly from the vicinity of the center of the non-linear optical crystal 109, and the temperature rises by about 3° C. at the maximum from the lowest temperature on the beam incident face.

The method for the control of the extension of the temperature distribution in the beam path in the non-linear optical crystal 109 is explained as follows.

Figure 6A:
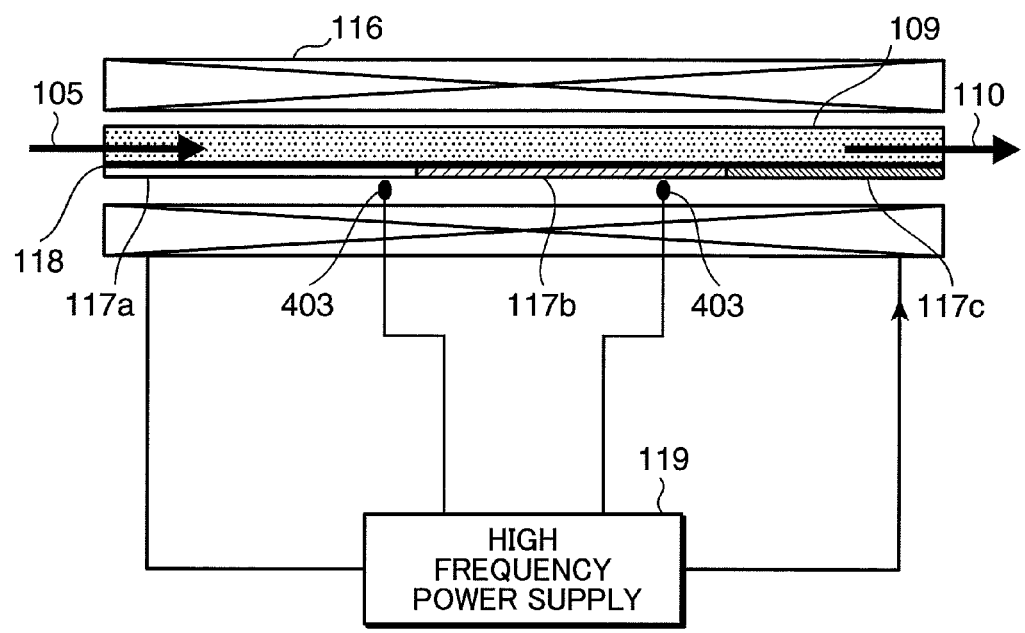
FIGS. 6A and 6B are explanatory views schematically showing the structure of a wavelength conversion laser light source in accordance with another embodiment of the present invention.

The extension of the temperature distribution of the beam path in the element can be reduced by changing the material of the magnetic metal 117 deposited on the injection side and the output side of the non-linear optical crystal 109 (kind) as one method (FIG. 6A). That is, the influence of the heat generated by as the non-linear optical crystal 109 absorbs the harmonic wave power output can be suppressed by suitably selecting the material of magnetic metal 117 used so that the more it approaches the beam output side of the non-linear optical crystal 109, the more the holding temperature decreases.

For instance, when the non-linear optical crystal 109 is divided into two, i.e., the beam injection side and the beam output side, the nickel base alloy is deposited to the beam injection side as the magnetic metal 117 while depositing to the beam output side, platinoid etc., whose amount of induction heating is smaller than the nickel base alloy.

Moreover, the temperature that generates heat can be changed by depositing a different kind of magnetic metal 117a, 117b, and 117c in the longitudinal direction of the non-linear optical crystal 109 (beam traveling direction) when the non-linear optical crystal 109 is divided into three, i.e., the beam injection side, the center part, and the beam output side as shown in FIG. 6A.

When the non-linear optical crystal 109 is divided into three like the foregoing structure, the center part rises most as the temperature distribution of the beam path in the element. In response, the nickel base alloy is deposited for instance as the magnetic metal 117a on the beam injection side, and the magnetic metal 117c on the beam output side, and platinoid etc. are deposited as the magnetic metal 117b in the center part.

In the structure shown in FIG. 6A, the example of applying the magnetic metal 117 divided into the beam traveling direction of the non-linear optical crystal 109 into three has been explained. However, the present embodiment is not intended to be limited to the foregoing, and the magnetic metal 117 divided into two or four or more may be adopted.

For the deposition region of the magnetic metal 117, the heat generated from the non-linear optical crystal 109 is large at positions 70% or more to the output side from the beam incident face with respect to the total length of the non-linear optical crystal 109. Therefore, the magnetic metal 117 is preferably divided at the position of 50% to 70% to the output side from the beam incident face with respect to the total length of the non-linear optical crystal 109 (That is, a different kind of the magnetic metal 117 is to be selected).

By the way, the pump coil 116 is one alone for the structure of the FIG. 6A, and the electric current supplied from the high frequency power supply 119 to the pump coil 116 is not distinguished for each of the three regions (magnetic metals 117a, 117b, and 117c). In this case, the slope of the temperature distribution of the non-linear optical crystal 109 can be changed by changing the excitation frequency of the high frequency signal to be supplied to the pump coil 116. However, as explained below, the structure of FIG. 6B is suitable to perform the temperature control for the fine adjustment of each region.

Figure 6B:
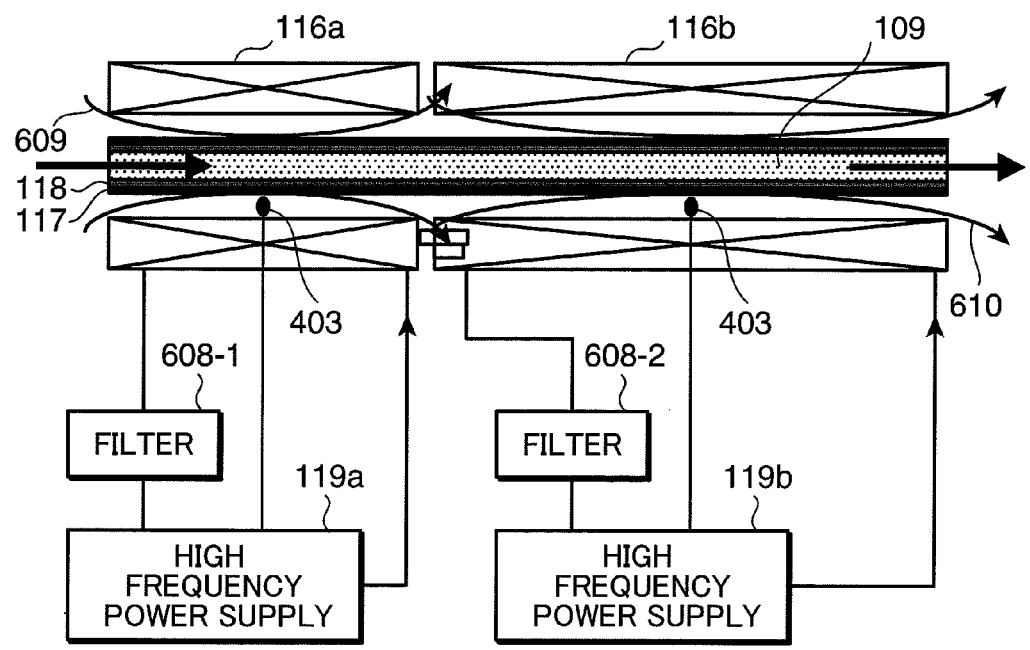

That is, it is a structure that can greatly reduce the extension of the temperature distribution of the non-linear optical crystal 109, and the high frequency signals (high-frequency current) of respectively different frequencies are applied by using two pump coils 116a and 116b as shown in FIG. 6B to control the temperature by dividing the heat generating region. The non-linear optical crystal 109 is designed so that the pump coil 116a is provided on the beam incident side, and the pump coil 116b is provided on the beam output side, and the pump coils 116a and 116b should not mutually have the overlapping area. The high frequency power supply 119a is connected with the pump coil 116a, and the high frequency power supply 119b is connected with the pump coil 116. Then, it is possible to drive the pump coils 116a and 116b independently. That is, the temperature control is possible in each installation region of the two pump coils 116a and 116b.

For the deposition region of the magnetic metal 117, the heat generated from the non-linear optical crystal 109 is large at positions 70% or more to the output side from the beam incident face with respect to the total length of the non-linear optical crystal 109. Therefore, the magnetic metal 117 is preferably divided at the position of 50% to 70% to the output side from the beam incident face with respect to the total length of the non-linear optical crystal 109.

According to the present embodiment, the characteristic driving method is adopted wherein different drive frequencies are set for the pump coils 116a and 116b according to the harmonic wave output power from the non-linear optical crystal 109. Here, the drive frequencies of the pump coils 116a and 116b are assumed to be f1 and f2 respectively, and the driving of the pump coils 116a and 116b is explained as follows.

The explanations will be given through the case of adopting the MgO:LiNbO$_3$ crystal having the periodical polarization inversion structure as the non-linear optical crystal 109, and the harmonic wave of 532 nm is generated from the fundamental wave of 1064 nm.

It is designed so as to match the drive frequencies of the pump coils 116a and 116b are matched (f1=f2) when the harmonic wave output power from the non-linear optical crystal 109 is not more than 1.5 W. In this case, the magnetic flux 609 in the pump coil 116a flows in the same direction as the magnetic flux 610 in the pump coil 116b. On the other hand, when the harmonic wave output power from the non-linear optical crystal 109 exceeds 1.5 W, the drive frequencies of the pump coils 116a and 116b are set so as to satisfy the condition of f1>f2. That is, when the harmonic wave output power falls in the range of 1.5 W to 2 W or more, the optical absorption by the non-linear optical crystal 109 greatly influences.

By setting so as to satisfy the condition of f1>f2 when the harmonic wave output power falls in the above range, it is possible to make the amount of heat that heats the beam output side of the non-linear optical crystal 109 smaller than the amount of heat that heats the beam injection side. The temperature non-uniformity of the beam injection side and the beam output side of the non-linear optical crystal 109 due to the absorption of light can be reduced.

In this case, the signal that returns to the oscillation circuit might increase by the magnetic fluxes 609 and 610 generated respectively in the pump coils 116a and 116b, which in turn causes electrical interference. In response, the filter 608-1 that cuts the frequency f2 with which the pump coil 116b is driven is provided in the excitation circuit for driving the pump coil 116a, and the filter 608-2 that cuts frequency f1 with which the pump coil 116a is driven is provided in the excitation circuit for driving the pump coil 116b. As a result, the interference by the magnetic fluxes 609 and 610 can be prevented. As the material of magnetic metal 117 which serves as the heating unit, tantalum, tantalum alloy, nickel, cobalt nickel base alloy, platinoid, and iron and the nickel base alloy, etc. are preferably used in consideration of the adhesion with MgO:LiNbO$_3$ crystal element. FIG. 7A shows the results of experiments as to the base material when the magnetic metal which serves as the heating unit is deposited to the non-linear optical crystal 109, the resistivity of the base material, the fundamental wave transmission of the non-linear optical crystal whose polarization has been reversed after the temperature cycling test (100 cycles) in a temperature range of 0° C. to 80° C.

The following will explain the respective conditions shown in the table of FIG. 7A.
(Condition 1)
After the conductive silver paste (resistivity $5 \times 10^{-5}$ Ω·cm) had been applied to the surface of the non-linear optical crystal as a base material to the 100 micron thickness, 1000 angstrom tantalum was deposited as a magnetic metal.
(Condition 2)
After an insulating coating material A (resistivity of $1 \times 10^8$ Ω·cm) had been applied to the surface of the non-linear optical crystal as a base material to the 50 micron thickness, 1000 angstrom tantalum was deposited as a magnetic metal.
(Condition 3)
After an insulating coating material B (resistivity of $2 \times 10^{11}$ Ω·cm) had been applied to the surface of the non-linear optical crystal as a base material to the 50 micron thickness, 1000 angstrom tantalum was deposited as a magnetic metal.
(Condition 4)
By the RF sputtering, SiO$_2$ film (base material) is formed to 1000 angstrom on the surface of the non-linear optical crystal, and 1000 angstrom tantalum was then deposited as a magnetic metal.
(Condition 5)
By the Plasma CVD, SiO$_2$ film (base material) is formed to 1000 angstrom on the surface of the non-linear optical crystal, and 1000 angstrom tantalum was then deposited as a magnetic metal.
(Condition 6)
The single element of the non-linear optical crystal was prepared for comparison (reference element).

Ten samples of the above-mentioned condition were prepared respectively (number of samples n=10), and the thermal cycling test was performed in a temperature range of 0° C. to 80° C. (100 cycles). The fundamental wave transmission of the following non-linear optical crystal after 100 cycles was checked, to determine if the respective sample can be used as a base material.

Firstly, it was confirmed that the fundamental wave transmission did not change for the condition 6 that was the comparison example as a reference. Next, it was confirmed that the fundamental wave transmission did not change in the condition 3 and the condition 5, and confirmed the fundamental wave transmission had decreased by about 1% in the condition 2. In the condition 1 and the condition 4, the fundamental wave transmission decreased by 3% or more, which showed that the absorption of the fundamental wave was large.

The result of observing the change in the above-mentioned fundamental wave transmission is shown in FIG. 7B as an amount of change in the phase matching temperature. It is known that the element breakdown in the non-linear optical crystal is liable to occur by the optical absorption when the phase matching temperature changes by not less than 1° C. In response when the material is selected to suppress the phase matching temperature changes below 1° C., it is necessary to select a material with the resistivity of $1 \times 10^8$ Ω·cm or more. Furthermore, in order to obtain the same amount of the phase matching temperature change as the reference (condition 6), it is preferable to select a material with the resistivity of $2\times10^{11}$ Ω·cm or more.

Moreover, it is insulated in the above-mentioned condition 4 and condition 5 by the method of forming the insulation film on the surface of the non-linear optical crystal. From the experiments performed under the conditions 4 and 5, it was found that as compared to the condition 4 (sputtering) under which a problem of a film omission etc. is liable to occur, the condition 5 (CVD) is more desirable under which a more precise film can be formed.

Figure 8A:
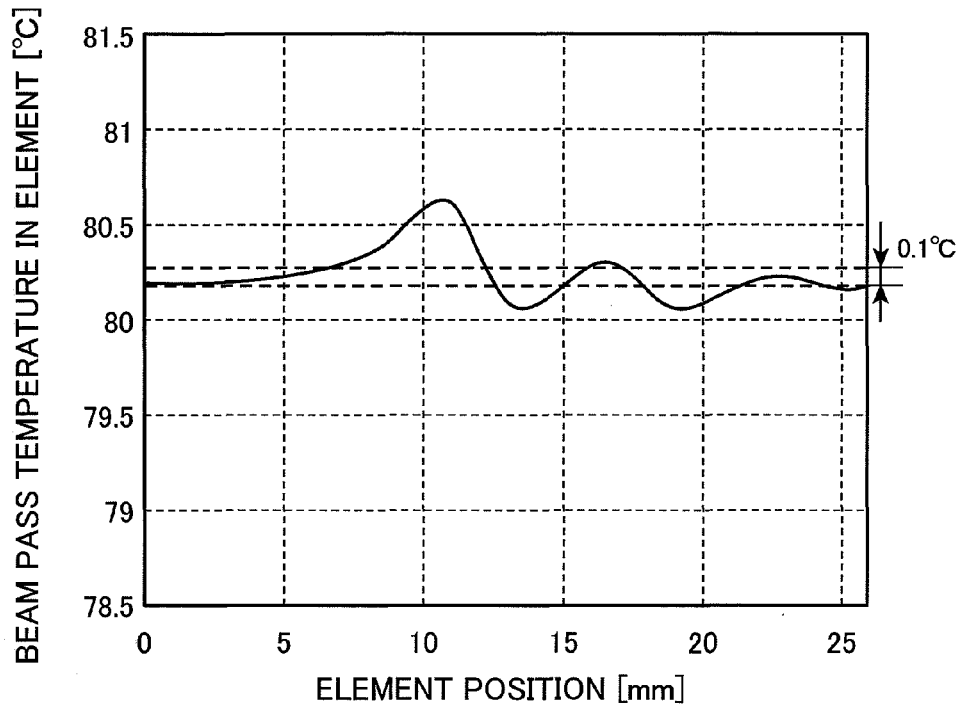
FIG. 8A is a graph showing the relation between the element position and the beam pass temperature in the non-linear optical crystal in the case of performing the region divided temperature control.

The FIG. 8A shows the beam path temperature in the non-linear optical crystal 109 in the case of performing the region divided temperature control. The temperature tolerance range of the non-linear optical crystal 109 according to the present embodiment (full width at half maximum) is around 1° C. Without performing the region divided temperature control, the temperature in the beam pass of the element varies within the maximum range of 3° C., which exceeds the temperature tolerance range. In response, by adopting the region divided temperature control of the present embodiment, it is possible to reduce the variation in the temperature to the range of around 0.5° C.

As described, the effect of preventing the transmission decrease of the fundamental wave by using the insulating material as a base material can be appreciated especially when adopting as the wavelength conversion element the non-linear optical crystal whose polarization is reversed, such as PPLN, PPLT, and PPKTP.

Figure 8B:
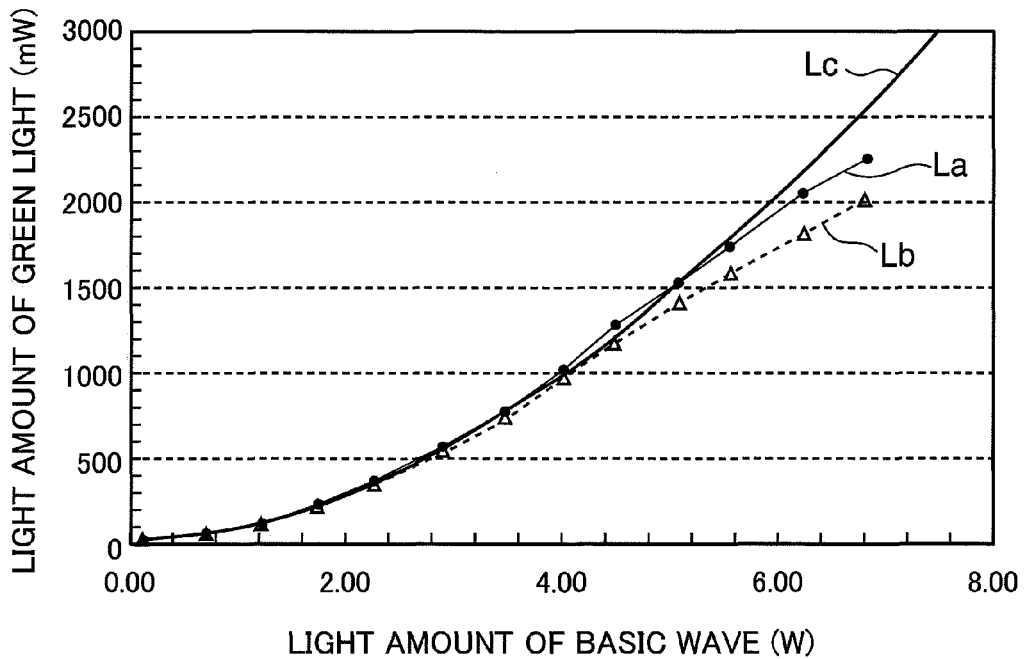
FIG. 8B is a plot diagram showing the relation between an amount of light of the green light (wavelength conversion light) with respect to an amount of light of the fundamental wave when performing the region divided temperature control and without when performing the region divided temperature control.

FIG. 8B is a plot diagram showing an amount of light of the green light (wavelength conversion light) with respect to an amount of light of the fundamental wave when performing the region divided temperature control that uses the temperature holding mechanism of FIG. 6B and without when performing the region divided temperature control.

When the region divided temperature control is not performed, the temperature of the beam path rises partially in the non-linear optical crystal 109 as shown in the dotted line Lb, and it deviates from the phase matching condition partially. Therefore, it is found that when the power output of green light becomes 1 W or more, the amount of light deviates from the calculated value that is the ideal value of the power output shown by the solid line Lc. On the other hand, when performing the region divided temperature control of the present embodiment, as shown by the solid line La, it was found that the deviation from the calculated value can be suppressed up to the point where the output power of the green light reaches the vicinity of 1.8 W, thereby realizing efficient wavelength conversion.

Next, the start-up time of the wavelength conversion laser light source, i.e., the rate of the temperature rise of the non-linear optical crystal, which is the problem to be solved by the present invention, is explained with reference to FIG. 9A and FIG. 9B.

Figure 9A:
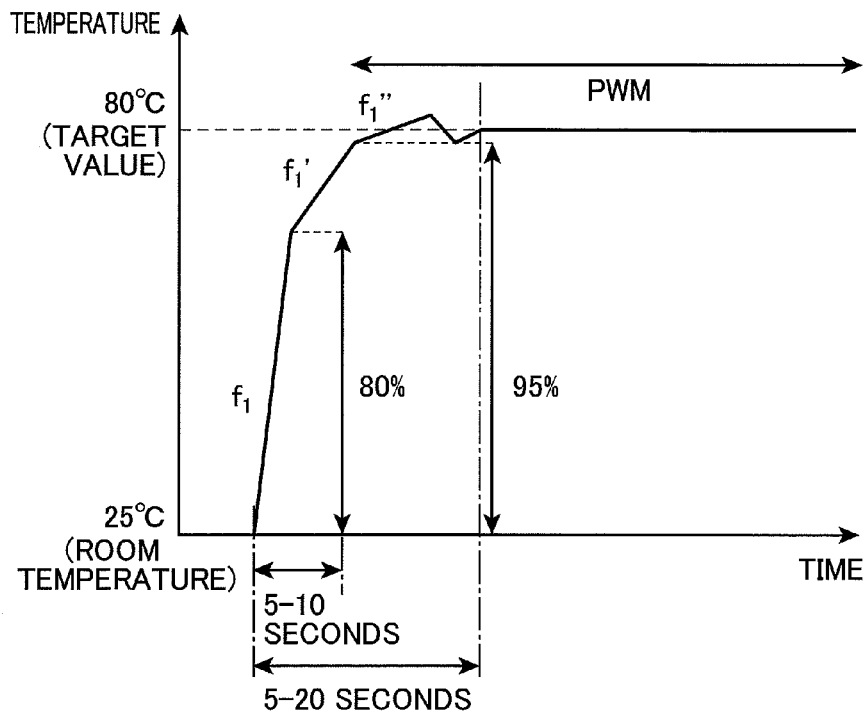
FIG. 9A is a plot diagram showing the temperature profile of the non-linear optical crystal with respect to time in the case of adopting the induction heating method in accordance with one embodiment of the present invention.

FIG. 9A is a plot diagram that showed the temperature profile of the non-linear optical crystal 109 with respect to time in the case of adopting the induction heating method of the present embodiment. The target temperature of the non-linear optical crystal 109 at this time was set to 80° C. The time required for heating the non-linear optical crystal 109 from the room temperature (25° C. for instance) to 80° C. (80% of the target temperature was around 10 seconds, and the prompt temperature rise can be made. When the temperature of the non-linear optical crystal 109 reaches 80% of the target temperature, the slope of the temperature rise was reduced by reducing the excitation frequency of the high frequency signal applied to the pump coil 116. Furthermore, when the temperature of the non-linear optical crystal 109 reached 95% of the target temperature, the amount of the overshoot (amount that exceeds the target temperature) was reduced by reducing the excitation frequency and performing the PWM control of the high frequency signal.

The setting time (the time required for heating the non-linear optical crystal 109 from the start of heating to the stabilized target value) when adopting the foregoing induction heating method was in a range of 15 to 20 seconds.

Figure 9B:
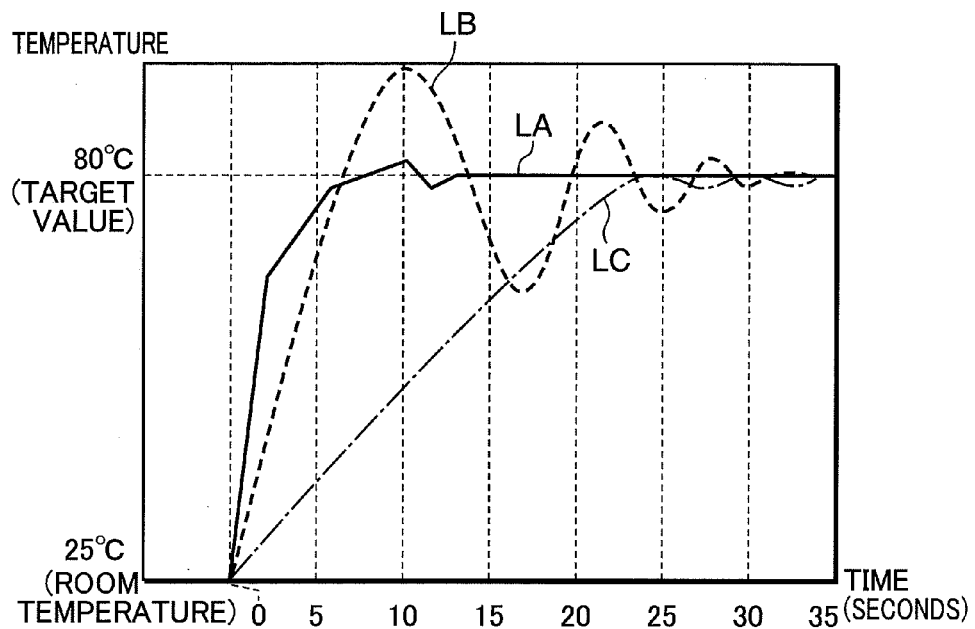
FIG. 9B is a plot diagram that compares the conventional structure of adopting a heater or a Peltier device, and the structure of adopting the induction heating method of the present embodiment, and shows the temperature profile of the non-linear optical crystal with respect to time.

FIG. 9B is a plot diagram that compares the conventional structure of adopting a heater or a Peltier device, and the structure of adopting the induction heating method of the present embodiment, and shows the temperature profile of the non-linear optical crystal with respect to time.

As shown with the dotted line LB, in the case of adopting the heater of the conventional structure, it was found that an amount of overshooting was large, and the setting time of 30 seconds was needed. In the case of adopting the conventional Peltier device of the structure, as shown by the alternate long and short dash line LC, it was found that although the amount of overshooting is small, the settling time of around 25 seconds was still needed, and the start-up speed was slow.

In the case of adopting the induction heating method of the present embodiment is advantageous in that as shown with solid line LA, a minimum time is required for heating the element to 80% to 90% of the target value among the three methods, which in turn realizes a prompt start-up of the wavelength conversion laser source.

According to the present embodiment, by using the high frequency induction heating method in place of a conventional heater and a Peltier device as the temperature holding mechanism of the non-linear optical crystal 109 of the wavelength conversion laser light source 100, it is possible to reduce the standby power required by realizing a rapid temperature rise, or to reduce the start-up time of the laser equipment adopting the wavelength conversion laser source 100. Moreover, the heating unit is the magnetic metal 117 deposited to the surface of the non-linear optical crystal 109, and therefore the rupture due to the difference in coefficient of thermal expansion of the heating unit and the non-linear optical crystal 109 can be prevented. Moreover, by using the high frequency induction heating method, even if the breaking of the magnetic metal 117 as deposited occurs, it is possible to keep heating the non-linear optical crystal 109, thereby realizing a longer life of the wavelength conversion laser light source 100 and equipments adopting the same.

Furthermore, by adopting the structure wherein the non-linear optical crystal 109 is divided into plural regions in the beam traveling direction, and the pump coils 116a and 116b are provided in respective regions, it is possible to suppress the effect of heat generated as the non-linear optical crystal 109 absorbs the harmonic wave. In FIG. 8B, the structure wherein the non-linear optical crystal 109 is divided into two regions is shown. However, the structure wherein the non-linear optical crystal 109 is divided into three or more regions in the beam traveling direction, and three or more pump coils are respectively in the regions may be adopted.

The other parts of the non-linear optical crystal 109 can be prevented from being undesirably heated by the magnetic flux extending to the other parts of the non-linear optical crystal 109. Therefore, as shown in FIG. 1, it is preferable that the surroundings of the pump coil that surrounds the non-linear optical crystal 109 are covered with a non-magnetic metal 120 (non-magnetic conductor).

Second Embodiment

A wavelength conversion laser source 1000 according to the present embodiment is shown in FIG. 10. In the present embodiment, a non-linear optical crystal 1001 is provided in the outside of pump coils 1003 (1003-1 to 1003-6).

Hereafter, the wavelength conversion laser source 1000 according to the present embodiment is explained in reference to the figures. In the present embodiment, explanations on the members having the same structures and the functions as the first embodiment shall be omitted by designating the same reference numerals for convenience for explanations.

The wavelength conversion laser source 1000 of the present embodiment includes a fundamental wave light source 101 of the same structure as the first embodiment shown in FIG. 1. The output power of the wavelength conversion laser beam is controlled by the electric current supplied from the power supply 114 to the pump LD 102 of fundamental wave light source 101.

As the means for holding the temperature of the non-linear optical crystal 1001 constant, adopted is the structure wherein the magnetic metal 1002 deposited to the surface of the non-linear optical crystal 1001 through an insulating material 1004 generates heat by the high frequency induction heating. Namely, the present embodiment is common with the first embodiment in that the high frequency induction heating method is adopted.

Figure 10A:
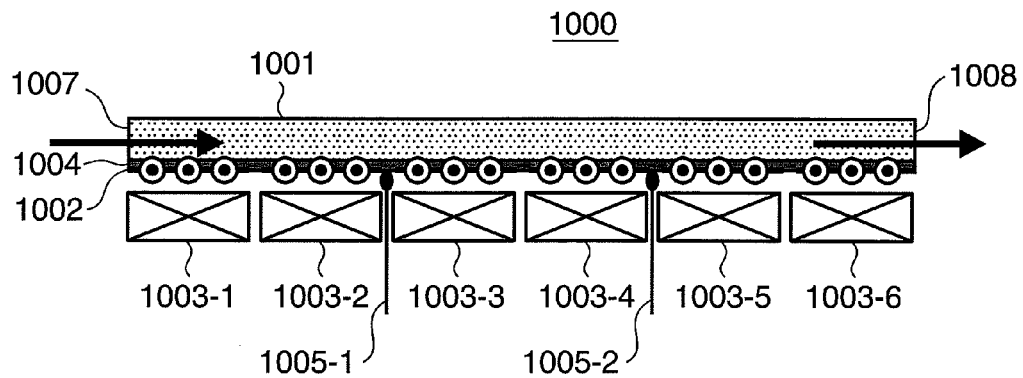
FIGS. 10A through 10C are explanatory views schematically showing the structure of a wavelength conversion laser light source in accordance with still another embodiment of the present invention.
Figure 10B:
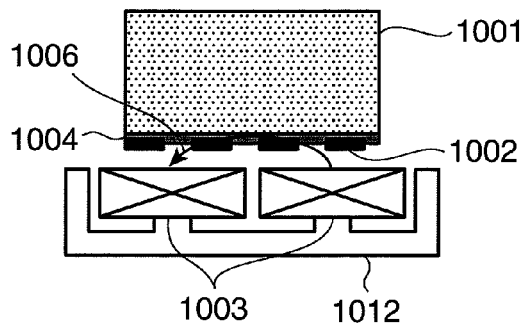
Figure 10C:
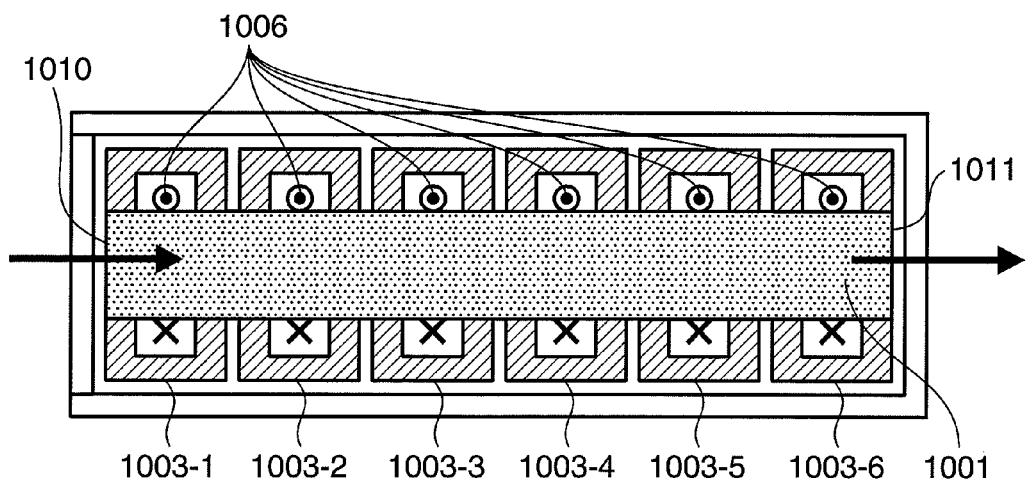

The present embodiment differs from the first embodiment in the shape and the structure of the pump coil 1003 for heating the non-linear optical crystal 1001. Specifically, while the non-linear optical crystal is disposed in the pump coil in the first embodiment (See FIG. 3), a plurality of pump coils 1003 are disposed in a vicinity of the side face of non-linear optical crystal 1001 in the present embodiment. FIG. 10 schematically shows the arrangement of the non-linear optical crystal 1001 and the pump coil 1003, which serves as a heater for holding the temperature of the non-linear optical crystal 1001 constant. The FIG. 10A is a side view. FIG. 10B is a front view seen from the fundamental wave incident face. FIG. 10C is a plan view seen from the upper part.

A magnetic metal 1002 is deposited to the bottom surface of the non-linear optical crystal 1001 via the insulating material 1004, and further the pump coil 1003 is disposed under the magnetic metal 1002. In the present embodiment, six pump coils 1003-1 to 1003-6 are provided sequentially arranged from the injection side of the fundamental wave beam in the beam traveling direction. As shown in FIG. 10B, each of the pump coils 1003-1 to 1003-6 operates in a pair of two coils provided in a direction orthogonal to the direction of the coil array (beam traveling direction). The high frequency induction heating mechanism of the present embodiment concentrates on the magnetic metal 1002 with which the magnetic flux 1006 is deposited to the bottom surface of non-linear optical crystal 1001 via the insulating material 1004. Therefore, as shown in FIGS. 10A and 10C, the pump coil 1003 is disposed in the longitudinal direction of non-linear optical crystal 1001 (beam traveling direction) so that the magnetic flux 1006 is provided vertically. As shown in FIG. 10B, the pump coil 1003 is supported by the coil receiving 1012 that serves as the magnetic circuit, and only the surface facing the non-linear optical crystal 1001 is opened.

The temperature of the non-linear optical crystal 1001 is detected by the thermistor 1005-1 and the thermistor 1005-2 provided under the non-linear optical crystal 1001. Then, based on the temperatures detected by the thermistor 1005-1 and the thermistor 1005-2, the PWM control is performed to control an amount of heat to be applied by switching ON/OFF time of the high-frequency current to be applied to each pump coil 1003. When performing the PWM control, it is possible to reduce the influence of the magnetic flux generated from the pump coil on the adjacent magnetic flux by making the excitation timing of the pump coil 1003-1•3•5 and the pump coil 1003-2•4•6 differ (shifted).

When the excitation timing is shifted, the high-frequency current is generated with the single inverter circuit. Here, it is preferable that the pump coils to be controlled have the same inductance from the viewpoint of impedance matching.

Moreover, the rate of temperature rise can be controlled by adjusting the frequency of the high frequency signal (high-frequency current), that excites the pump coil 1003. The temperature controller of the present embodiment controls by switching ON/OFF the high frequency signal from the high frequency power supply while controls the slope of the rate of temperature rise of non-linear optical crystal 1001, by adjusting the depth of penetration of the eddy current generated on the surface of magnetic metal 1002.

In the present embodiment, the heat generating region of the non-linear optical crystal 1001 can be divided between the fundamental wave incident part 1007 and the output part 1008 by dividing the pump coil 1003.

Figure 11:
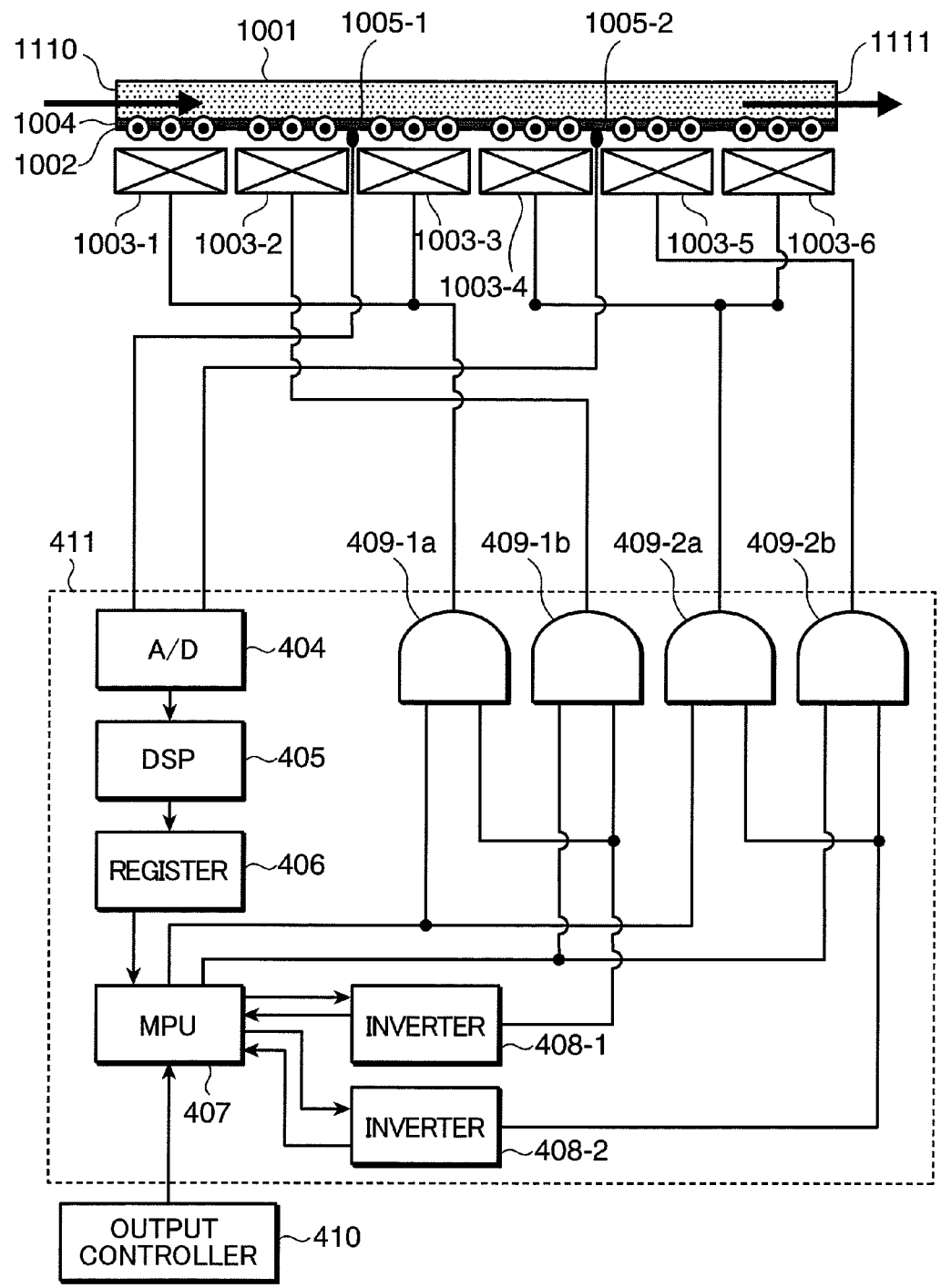
FIG. 11 is a block diagram showing schematic structures of a temperature controller provided in the wavelength conversion laser light source of FIG. 10.

For example, the structure shown in FIG. 11 may be adopted, and by driving three incident side pump coils and three output side pump coils respective with different frequencies, it is possible to vary an amount of heat generated between the fundamental wave incident side and the output side of the non-linear optical crystal 1001. Specifically, when the non-linear optical crystal 1001 absorbs the resulting harmonic wave, and self-generates heat, it is possible to improve non-uniform temperature distribution in the non-linear optical crystal 1001 by controlling the driving frequency of the pump coil 1003-1 to 3 and pump coil 1003-4 to 1003-6 to add or subtract the amount of heat corresponding to the self heating respectively. When the driving frequency of the pump coil 1003 is a frequency of the operation lower limit, the heat value can be reduced by reducing the pulse width of the PWM control.

FIG. 11 shows the structure of the temperature holding mechanism wherein the heat-generating region of the non-linear optical crystal 1001 is divided. To control the driving frequency of the pump coil 1003-1 to 3 and pump coil 1003-4 to 1003-6 respectively, temperature controller 411 mounts two inverter circuits (408-1,408-2) as the high-frequency current generation circuit, and controls the driving frequency according to the position in the non-linear optical crystal 1001. The temperature of the non-linear optical crystal 1001 is monitored at two positions by using temperature sensor 1005-1 and 1005-2 made up of the thermistor etc. The temperature sensor 1005-1 detects the temperature on the fundamental wave beam injection side of the non-linear optical crystal 1001. On the other hand, the temperature sensor 1005-2 detects the temperature of the fundamental wave beam output side of the non-linear optical crystal 1001. The monitored temperature signal is A/D converted by the A/D converter 404, and is passed through the digital filter composed in the DSP 405 to remove the high frequency noise excited from the pump coils 1003-1 to 6. The temperature signal is temporarily stored in the register 406, operated with MPU 407 and determined, and the driving frequency of the pump coil and the command signal of the PWM control of the pump coil are generated with the MPU 407. The inverter circuits 408-1,408-2 generate the high-frequency current based on the driving frequency determined by the MPU 407. As for the high-frequency current generated by the inverter circuit 408-1,408-2 is subjected to the logical product with the PWM control signal from the MPU 407 in the switching circuit 409-1*a*, 1*b*, 2*a*, and 2*b*, and excites the pump coils 1003-1 to 1003-6, and heats the non-linear optical crystal 1001. The signal of the target harmonic wave output power from the output power controller 410 and the signal of the present value of the harmonic wave output power are input to the MPU 407. The MPU 407 calculates and determines the driving frequency of the pump coil based on these signals. For instance, when generating a green light, within the harmonic wave output power of up to 1 W, the excitation of the pump coil 1003-1 to 3 and pump coil 1003-4 to 1003-6 with the same wavelength and the same PWM signal waveform. When the harmonic wave output power falls in the range of 1 W to 1.5 W, by setting the frequency of the pump coils 1003-4 to 1003-6 lower than that of the pump coils 1003-1 to 1003-3, the set temperature value of the element of the beam output side of the non-linear optical crystal 1001 is decreased by about one degree lower than the beam injection side. Further, when the harmonic wave output power falls in the range of 1.5 W to 2 W, by setting the frequency of the pump coils 1003-4 to 1003-6 lower than that of the pump coils 1003-1 to 3, and the excitation time of the pump coils 1003-4 to 1003-6 shorter than that of the pump coils 1003-1 to 1003-3, the set temperature value of the element of the beam output side of the non-linear optical crystal 1001 is decreased by about two degrees lower than the beam injection side.

FIG. 12 shows the control flow of the driving method of the present embodiment. Upon starting the control flow program, it is operated in the start-up mode first.

Upon starting the start-up mode, the temperature controller 411 obtains the temperature initial value T of the non-linear optical crystal 1001 detected by the temperature sensors 1005-1, 1005-2 (S21). Next, the temperature controller 411 obtains the output power set value Psv of the wavelength conversion laser source 1000 from the power output controller 410 (S22), and sets the temperature set value Tsv corresponding to the output power set value Psv (S23). The temperature table that records the relation between the output power set value Psv and the temperature set value Tsv is stored in the register 406, and the temperature set value Tsv corresponding to the output power set value Psv is set referring to the temperature table.

Thereafter, the temperature controller 411 obtains the temperature present value Tpv of the non-linear optical crystal 109 detected by the temperature sensors 1005-1, 1005-2 (S24), and the coefficient G shown in the equation (2) is calculated by using the temperature initial value T, the temperature preset value Tsv, and the temperature present value Tpv (S5).

$$G=(Tpv-T)/(Tsv-T) \quad (2)$$

The temperature controller 411 determines the duty of the PWM waveform of the high frequency signal, and the frequency of the high frequency signal (high-frequency current) supplied to the pump coil 1003 according to the above-mentioned coefficient G. Namely, the excitation frequency of the high frequency signal to be supplied to all the pump coils 1003-1 to 6 is set to f, and the duty ratio of the high frequency signal is set to 100% when the coefficient G falls in the range of $G \leq 0.8$ (YES in S26) (S27).

The excitation frequency of the high frequency signal is set to f1', and the duty ratio of the high frequency signal is set to 100% when the coefficient G falls in the range of $0.8 < G < 0.95$ (NO in S6, and YES in S28) (S29). On the other hand, when the coefficient G falls in the range of $0.95 \leq G$ (NO in S26, and NO in S28), the excitation frequency of the high frequency signal is set to f1", and the duty ratio of the high frequency signal is adjusted to perform the PWM control (S30). As a result, it is controlled so that the coefficient G does not exceed 1.2.

Here, the excitation frequency is set so as to satisfy the condition of $f > f1' > f1''$, and it is set so that an amount of heat generated from the non-linear optical crystal 109 becomes smaller as the temperature approaches the target temperature without changing the present value.

The temperature controller 411 then obtains the temperature present value Tpv again and the output power present value Ppv, and determines if the output power present value Ppv falls in the range of $0 < Ppv < 1$ W, i.e., if the start-up mode is to be continued (S31). The foregoing steps are performed in the start-up mode wherein the pump coils 1003-1 to 1003-6 are controlled to be the same set temperature.

When the temperature controller 411 determines that the output power present value Ppv of the harmonic wave falls in the range of $0 < Ppv < 1$ W (YES in S31), the sequence goes back to S25 to calculate the coefficient G shown in the above equation (2), and then perform the loop temperature control in the start-up mode by repeating the forgoing steps of S25 to S31.

On the other hand, when the temperature controller 411 determines that the output power present value Ppv of the harmonic wave falls in the range of $Ppv > 1$ W (NO in S31), the sequence moves onto the high output power mode. In the high output power mode, the temperature controller 411 obtains the temperature present value Tpv (Tpv1,Tpv2) of the non-linear optical crystal 1001 detected by the temperature sensors 1005-1,1005-2 (S32). The temperature controller 411 obtains a temperature set value Tsv1 and Tsv2 of each of the divided regions with respect to the output power present value Ppv stored beforehand in the register 406 based on the output power present value Ppv (S33). Namely, the temperature table that records the relation between the output power set values Psv and the temperature set values Tsv1 and Tsv2 is stored in the register 406, and the temperature set values Tsv1 and Tsv2 corresponding to the output power set value Psv are set referring to the temperature table. Here, the temperature set value Tsv1 is a temperature set value for the pump coils 1003-1 to 3, and temperature set value Tsv2 is a temperature set value for the pump coils 1003-4 to 1003-6. Thereafter, the temperature controller 411 sets the excitation frequency of the pump coils 1003-1 to 1003-3 to f1=f" based on the temperature set value Tsv1, and sets the excitation frequency of the pump coils 1003-4 to f2=f2"<f" based on the temperature set value Tsv2 (S34). The temperature controller 411 then performs the PWM control to each of the pump coils 1003-1 to 6 while monitoring the temperature present value Tpv1 on the beam injection side of the non-linear optical crystal 1001 and temperature present value Tpv2 on the beam output side (S35).

Next, the temperature controller 411 obtains the output power present value Ppv to be recorded in the register 406 (S36). Here, when the temperature controller 411 determines that the Ppv falls in the range of $1 < Ppv$ (YES in S37), the sequence goes back to S22, and the operation in the high output power mode is continued. On the other hand, when the temperature controller 411 determines that the Ppv falls in the range of $Ppv \leq 1$ (NO in S37), the sequence goes back to S24, and the operation in the start-up mode is performed. With the foregoing control method of the present embodiment, the similar effect as achieved from the structure shown in FIG. 8 of the first embodiment could be achieved.

In the present embodiment, the other parts of the non-linear optical crystal 1001 can be prevented from being undesirably heated by the magnetic flux extending to the other parts of the non-linear optical crystal 1001 as in the case of the first embodiment. Therefore, it is preferable that the surroundings of the pump coil that surrounds the non-linear optical crystal 1001 are covered with a non-magnetic metal 120 (non-magnetic conductor). For the non-magnetic metal, aluminum, copper, and zinc, etc., may be used.

For the structure of the side face of the non-linear optical crystal 1001 (the faces other than the light incident and output face), the magnetic metal is deposited on the face to be heated via the insulating material; however, it is preferable that the other three faces are covered with non-magnetic conductor via the insulating material.

Third Embodiment

A wavelength conversion laser source 1000 according to the present embodiment is shown in FIGS. 13 and 15. As shown in FIG. 15, in the present embodiment, a wavelength conversion element 1305 is provided in the outside of pump coils 1503 (1503-1 to 1503-6).

Hereafter, the wavelength conversion laser source device 1300 according to the present embodiment is explained in reference to the figures. In the present embodiment, explanations on the members having the same structures and the functions as the first and second embodiments shall be omitted by designating the same reference numerals for convenience for explanations.

Figure 13A:
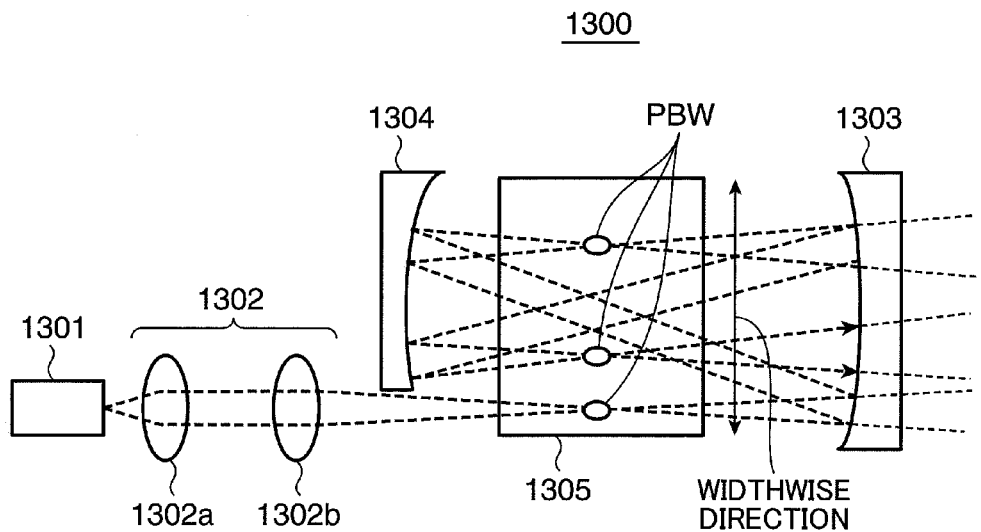
FIGS. 13A through 13C are explanatory views schematically showing the structure of a wavelength conversion laser light source in accordance with still another embodiment of the present invention.
Figure 13B:
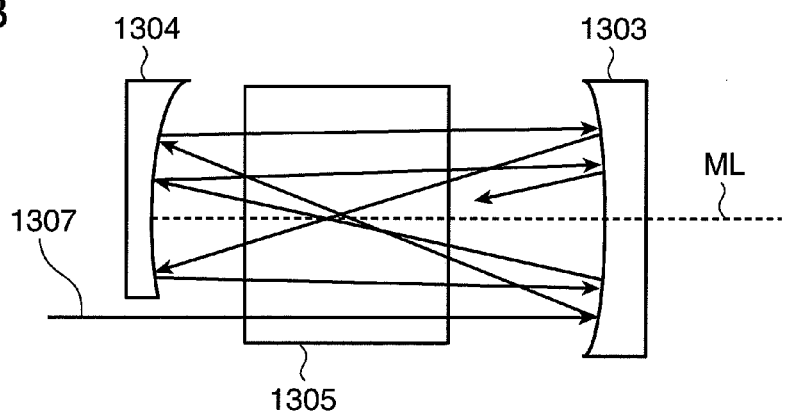

FIG. 13A is a schematic view of a wavelength conversion laser light source device 1300 according to the present embodiment of the invention. FIG. 13B explains fundamental beams which pass through a wavelength conversion element 1305 while changing an incident angle at the wavelength conversion element, in which only a principal ray of a fundamental laser beam 1307 is shown.

As shown in FIG. 13A, the wavelength conversion laser light source device 1300 includes a fundamental laser light source 1, condensing optics 1302, a first concave mirror 1303, a second concave mirror 1304, and a wavelength conversion element 1305. The first concave mirror 1303 and the second concave mirror 1304 are disposed so as to face one another, and the wavelength conversion element 1305 is provided between the first concave mirror 1303 and the second concave mirror 1304.

A fundamental laser beam emitted from the fundamental laser light source 1 is controlled by the condensing optics 2 so that it is condensed to the focal point (beam waist position $P_{BW}$) and injected between the reflective surfaces made up of the first concave mirror 1303 and the second concave mirror 1304. The fundamental laser beam then enters into the wavelength conversion element 1305 provided between the first concave mirror 1303 and the second concave mirror 1304 and a part thereof is converted to a second harmonic wave by the wavelength conversion element 1305 (first pass).

The fundamental laser beam and the second harmonic laser beam having passed through the wavelength conversion element 1305 (first pass) reach the first concave mirror 1303. A coating that reflects the fundamental laser beam and transmits the second harmonic laser beam (wavelength-converted laser beam) is applied on the concave surface of the first concave mirror 1303. Accordingly, the fundamental laser beam is reflected from the first concave mirror 1303 whereas the second harmonic wave laser beam (wavelength-converted laser beam) passes through the first concave mirror 1303 to be outputted.

The fundamental laser beam is reflected from the first concave mirror 3 and is re-entered into the wavelength conversion element 1305, and a part thereof is converted to a second harmonic wave (second pass).

The fundamental laser beam and the second harmonic laser beam having passed through the wavelength conversion element 1305 (second pass) reach the second concave mirror 4. Herein, a coating that reflects both the fundamental laser beam and the second harmonic laser beam is applied on the concave surface of the second concave mirror 1304. Accordingly, both the fundamental laser beam and the second harmonic laser beam are reflected from the second concave mirror 1304 and are re-entered into the wavelength conversion element 1305. Then, a part of the re-entered fundamental laser beam is converted to a second harmonic wave by the wavelength conversion element 1305 (third pass).

The fundamental laser beam and the second harmonic laser beam having passed through the wavelength conversion element 1305 (third pass) again reach the first concave mirror 1303. The second harmonic laser beam passes through the first concave mirror 1303 to be outputted, whereas the fundamental laser beam is reflected from the first concave mirror 1303 and re-enters into the wavelength conversion element 1305 (fourth pass).

By repeating the actions as above, the fundamental laser beam repetitively passes through the wavelength conversion element 1305 (first pass, second pass, . . . , and n'th pass) while it reciprocates between the two reflective surfaces of the first concave mirror 1303 and the second concave mirror 1304, while being converted into a wavelength-converted laser beam by each pass.

The fundamental laser beam stops reciprocating between the reflective surfaces after it has reciprocated between the reflective surfaces several times to several ten times according to the curvature of the reflective surfaces (first concave mirror 1303 and second concave mirror 1304) and the alignment condition thereof as well as the settings of the condensing optics 1302. Wavelength-converted laser beams generated until the fundamental laser beam stops reciprocating are outputted from the first concave mirror 1303 in this embodiment.

The conversion efficiency η of the fundamental laser beam to the second harmonic waves by the wavelength conversion element 1305 can be expressed as:

$$\eta \alpha L^2 P/A \times \sin c^2(\Delta k L/2) \quad (3)$$

where L is the interaction length of the wavelength conversion element 1305, P is the power of the fundamental laser beam, A is the beam sectional area of the fundamental laser beam at the wavelength conversion element 1305, and $\Delta k$ is a shift of the phase from the phase matching condition.

As can be seen from the above expression (3), the conversion efficiency is high in the region with a small beam sectional area of the fundamental laser beam in the wavelength conversion element 1305. Namely, the conversion efficiency becomes remarkably high at the beam waist position $P_{BW}$ of a fundamental laser beam in the wavelength conversion element 1305 where the fundamental laser beam passes through. In the present embodiment, the condensing optics 1302 are arranged at a specific position on a beam path along which the fundamental laser beam is injected between the reflective surfaces 1303 and 1304, so that the beam waist positions $P_{BW}$ of the fundamental laser beams can be dispersed in the wavelength conversion element 1305 while the fundamental laser beam reciprocates between the reflective surfaces 1303 and 1304.

When the beam waist positions $P_{BW}$ are concentrated in the wavelength conversion element disposed between the reflective surfaces, there arise problems that the wavelength conversion element breaks due to light-induced damage and the wavelength conversion becomes unstable at the position where the beam waist points $P_{BW}$ are concentrated. These problems, however, can be solved by dispersing the beam waists $P_{BW}$ of the fundamental laser beams in the wavelength conversion element as in the foregoing structure of the present embodiment.

In particular, let f1 and f2 be focal lengths of the first concave mirror (first reflective surface) 1303 and the second concave mirror (second reflective surface) 1304, respectively, then, in a confocal alignment where the distance between the reflective surfaces is given by f1+f2 (in a case where the refractive index of the wavelength conversion element is not considered), the beam waist positions of the fundamental laser beam are concentrated on the confocal point of the two reflective surfaces. This concentration raises problems, such as light-induced damage on the wavelength conversion element and instability of wavelength conversion.

In the present embodiment, however, by adjusting the beam waist positions $P_{BW}$ of the fundamental laser beam by the condensing optics 1302, it becomes possible to achieve a stable output of the wavelength conversion laser device even when the confocal alignment is used. More specifically, in the first embodiment, the beam waist $P_{BW}$ of the fundamental laser beam is formed by the condensing optics 1302 before it goes incident on the first reflective surface as shown in FIG. 13A to avoid the beam waists from being formed at the confocal point of the first and second reflective surfaces in several passes. Accordingly, the wavelength conversion is performed at the different beam waist positions $P_{BW}$ dispersed in the wavelength conversion element 1305, thereby obtaining wavelength-converted laser beams under stable conditions. By scattering the beam waist positions $P_{BW}$ by the condensing optics 1302, it becomes possible to perform wavelength conversion by beam passes having different phase matching conditions at the respective beam waist positions $P_{BW}$ in a stable manner. This is the essential structure of the present embodiment capable of extracting wavelength-converted laser beams to be summed up in a stable manner.

Figure 14A:
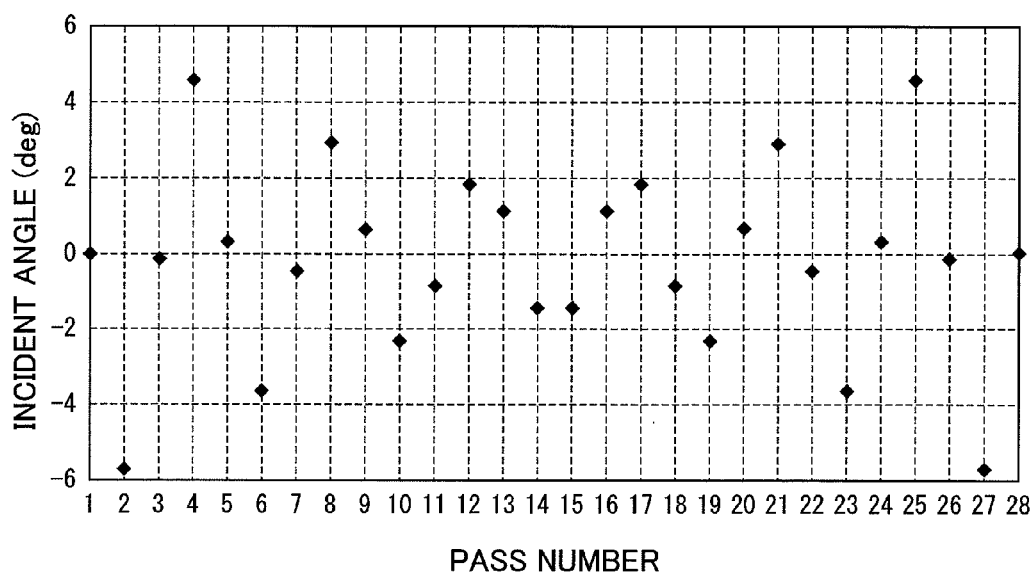
FIG. 14A is an explanatory view showing the relation of the pass number of the fundamental laser beam and the incident angle of each beam pass into the wavelength conversion element in accordance with wavelength conversion laser light source of FIG. 13A.

FIG. 14A is a graph showing the relation of the pass number of the fundamental laser beam and the incident angle of each beam pass into the wavelength conversion element 1305 according to the present embodiment.

In the present embodiment, the first concave mirror 1303 having the focal length f1 of 25 mm and the second concave mirror 1304 having the focal length f2 of 20 mm are used. The second concave mirror 1304 is cut off to be smaller than the first concave mirror 1303, to allow a fundamental laser beam to be injected between the two reflective surfaces from this cut-off portion. The principal ray axis ML linking the respective centers of the two reflective surfaces is, as shown in FIG. 13B, an optical axis linking the centers of curvatures of the both reflective surfaces. Owing to the condensing optics 1302, the fundamental laser beam enters into the wavelength conversion element 1305 and the first concave mirror 1303 to be parallel to the principal ray axis ML. As the wavelength conversion element 1305, $MgO:LiNbO_3$ (length: 26 mm and width: 10 mm) having the poled structure is used. A distance between the reflective surfaces is set to 58.4 mm and it is shifted slightly from the confocal alignment. As shown in FIG. 14A, the fundamental laser beam repetitively passes through the wavelength conversion element 1305 by reciprocating between the reflective surfaces while changing the incident angle at the wavelength conversion element 1305.

The phase matching condition referred to herein is a condition under which wavelength converted beams generated by a nonlinear optical material (wavelength conversion element) are phase-matched and the wavelength conversion efficiency reaches the maximum ($\Delta k=0$). The phase matching condition is determined by the wavelength of a laser beam, the refractive index of the nonlinear optical material, the incident angle of the laser beam, periods of the poled structure in the wavelength conversion element, and so forth. In a case where the wavelength conversion is performed by the conventional structure, the refractive index of the nonlinear optical material is adjusted by temperatures and the incident angle of a laser beam is adjusted so as to be matched with the phase matching condition. With the conventional structure, shifts in temperatures or incident angles would result in phase matching conditions ($\Delta k>0$) and a lower conversion efficiency. Furthermore, shifts in wavelengths would cause shifts in phase matching condition, and therefore re-adjustment or modification of the structure are required.

In the present embodiment, because the incident angle at the wavelength conversion element is changed for each pass, various factors (the wavelength of a laser beam, the refractive index (temperature) of the nonlinear optical material, the poling period, and so forth) satisfying the phase matching condition also vary from one pass to another. Accordingly, the wavelength conversion laser of the present embodiment has a plurality of phase matching conditions. In a case where wavelength conversion to a certain laser beam wavelength is performed, because there is more than one temperature satisfying the phase matching condition, even when the temperature shifts from a given phase matching condition, the temperature matches the phase matching conditions for other passes. It is therefore possible to compensate for a lower conversion efficiency.

Figure 14B:
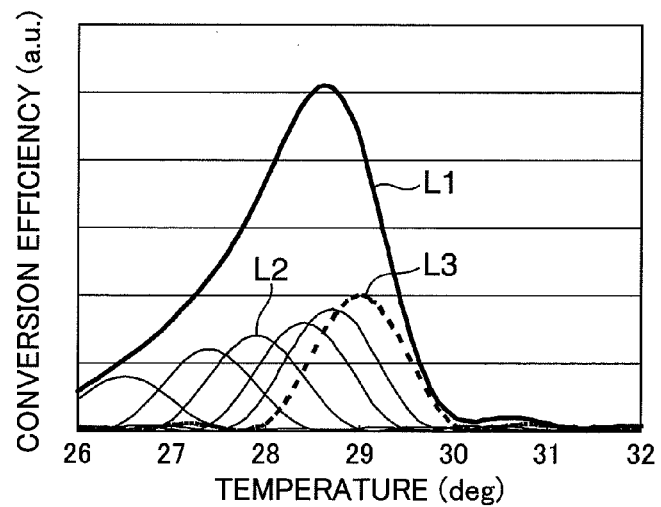
FIG. 14B is an explanatory view showing the relation of the temperature of the wavelength conversion element and the conversion efficiency in accordance with the wavelength conversion laser light source of FIG. 13A.

FIG. 14B shows a relation of the temperature of the wavelength conversion element 1305 and the conversion efficiency in the first embodiment. Referring to FIG. 14B, L1 denotes total conversion efficiency in the present embodiment, L2 denotes the conversion efficiency by each pass in the present embodiment, and L3 denotes the conversion efficiency by the conventional structure.

In the present embodiment, the temperature satisfying the phase matching condition differs for each pass because the incident angle of the fundamental laser beam at the wavelength conversion element 1305 differs in each pass. The overall conversion efficiency, which is found by adding up the conversion efficiency of each pass, is hardly lowered even when the temperature of the wavelength conversion element 1305 drops. In the case of the conventional structure, the full width at half maximum of conversion efficiency is 1.1 degrees. On the contrary, the full width at half maximum of the conversion efficiency in the first embodiment is 2.6 degrees. The structure of the present embodiment therefore realizes two or three times wider tolerance ranges than that of the conventional structure. Moreover, improved total conversion efficiency can be realized in a wider temperature range as compared to the conventional structure by arranging the fundamental laser beams to be repetitively injected into the wavelength conversion element 1305. In the first embodiment, total conversion efficiency is high and conversion efficiency reaches 60% or higher, which is twice as high as the conversion efficiency of the conventional structure.

In the wavelength conversion laser light source device 1300 of the present embodiment, the wavelength conversion element 1305 is disposed between two reflective surfaces each reflecting therefrom a laser beam and having a curvature, and a laser beam is injected between the reflective surfaces by the condensing optics 1302 from a portion without a reflection coating. By allowing the laser beam to reciprocate between the reflective surfaces to repetitively pass through the wavelength conversion element 1305 while changing an incident angle at the wavelength conversion element 1305, the wavelength conversion is repetitively performed with shifts in phase matching conditions. Here, the characteristic feature lies in that the condensing optics 1302 are arranged to disperse beam waist positions $P_{BW}$ of laser beams in the wavelength conversion element 1305, which reciprocate between the two reflective surfaces. Additionally, at least one of a pair of the reflective surfaces disposed so as to face one another transmits the wavelength-converted laser beams to emit the wavelength-converted laser beams. According to the structure described above, the tolerance ranges for phase matching conditions for temperatures and the like are widened by having more than one phase matching condition while maintaining high conversion efficiency. It is therefore possible to obtain wavelength-converted laser beams that are stable against environmental changes. Also, by dispersing the beam waist positions $P_{BW}$ of the laser beam in the wavelength conversion element 1305, it becomes possible to obtain high-output wavelength-converted laser beams with which light-induced damage on the wavelength conversion element 1305 and instability of wavelength conversion are eliminated.

In the first embodiment, a fiber laser having the center wavelength of 1064 nm and the spectrum full width at half maximum of 0.1 nm is used as the fundamental laser light source 1. However, the fundamental laser light source 1 is not limited to the foregoing example, and other than a fiber laser, for example, a solid-state laser, a semiconductor laser, a gas laser, a wavelength conversion laser, and so forth can be adopted. Additionally, in the first embodiment, wavelength conversion to second harmonic waves is performed. However, the wavelength conversion laser light source device 1300 of the present embodiment can be used for wavelength-converted laser beam generation, such as sum frequency generation, difference frequency generation, and optical parametric oscillation, with an appropriate selection for the laser light source.

The present embodiment is a preferable embodiment in which let D be the distance between two reflective surfaces, f1 and f2 be the respective focal lengths of the two reflective surfaces, and L be the length of the wavelength conversion element, then the following relationship holds:

$$f1+f2<D<f1+f2+L \quad (4).$$

In the first embodiment, D is set to 58.4 mm when f1 is 25 mm, f2 is 20 mm, and L is 26 mm. When the distance D between the reflective surfaces is set so as to satisfy the above expression (4), total conversion efficiency to the wavelength-converted laser beams can be increased because it is close to the confocal alignment of the two reflective surfaces and the fundamental laser beams pass through the wavelength conversion element 1305 a greater number of times as the number of reciprocation times of the beam pass increases. The focal length of the reflective surface is, in the case of a lens having an asymmetric reflective surface, a focal length in a direction in which an incident beam injected between the reflective surfaces shifts with respect to the principal ray axis ML. Let n be the refractive index of the wavelength conversion element, then it is preferable that the distance D between the reflective surfaces satisfies the condition of:

$$D \neq f1+f2+(1-1/n) \times L (=\text{confocal alignment}) \quad (5).$$

The confocal alignment referred to herein is the distance D at which the focal points of the two reflective surfaces are present at the same position. In a case where the distance D between the reflective surfaces is set to the confocal alignment, a laser beam may converge to the principal ray axis ML, which may possibly give rise to light-induced damage on the wavelength conversion element and instability of wavelength conversion at a high output. It is therefore preferable to set the distance D between the reflective surfaces to fall within the range satisfying the above expression (4), at which positions the reflective surfaces are slightly displaced from the confocal alignment. To be more concrete, the distance D is set so that two reflective surfaces are disposed at positions displaced by about 0.1 mm to 3 mm from the confocal alignment. It is particularly preferable to set the distance D to fall within a range so that the distance is shorter by 0.1 mm to 3 mm from the confocal alignment. By shortening the distance by the range specified above from the distance between the two reflective surfaces in the confocal alignment, not only it becomes possible to prevent the fundamental laser beam from converging to the focal positions of the reflective surfaces by ensuring the number of reciprocation times of the fundamental laser beam between the reflective surfaces, but it also becomes possible to increase margins for the fundamental laser beam injected between the reflective surfaces and the effective diameter of the second concave mirror 1304 (second reflective surface). The effective diameter of the reflective surface referred to herein is a length in the longitudinal direction of a range within which a laser beam hits the reflective surface.

As shown in FIG. 13A, the condensing optics 1302 of the first embodiment is made up of a fiber collimator 1302a and a plano-convex lens 1302b. The condensing optics 1302 controls a fundamental laser beam so that it is condensed inside the wavelength conversion element 1305 at a point other than the focal points of the two reflective surfaces for the beam waist positions $P_{BW}$ of the fundamental laser beam reciprocating between the reflective surfaces to be dispersed in the wavelength conversion element 1305. At the focal points of the two reflective surfaces, overlapping of the laser beam may occur, which possibly gives rise to breaking of the wavelength conversion element and instability of wavelength conversion. Likewise, in a case where wavelength conversion is performed intensively at one point, breaking of the wavelength conversion element and instability of wavelength conversion possibly occur. In the wavelength conversion element, the wavelength conversion is performed intensely at the condensed beam waist positions $P_{BW}$. However, the beam waist positions $P_{BW}$ are dispersed at positions other than the focal points of the two reflective surfaces. In the present embodiment, by performing wavelength conversion at the beam waist positions $P_{BW}$ dispersed in the wavelength conversion element 1305, wavelength-converted laser beams can be outputted in a stable manner. It should be noted here a problem is not raised when the beam waist positions $P_{BW}$ of the laser beam converge to the focal positions of the two reflective surfaces after repetitively carrying out the wavelength conversion at the beam waist positions $P_{BW}$ dispersed in the wavelength conversion element 1305.

As shown in FIG. 13A, the present embodiment is a preferable embodiment wherein a fundamental laser beam is condensed by the condensing optics 1302 between the reflective surfaces of the first concave mirror 1303 and the second concave mirror 1304 before it is reflected from the first concave mirror 1303. By having a focal point (beam waist position $P_{BW}$) between the reflective surfaces before the fundamental laser beam is reflected from the reflective surface, it is possible to form the beam waists in many laser beam passes none of which passes by the vicinity of the focal points of the reflective surfaces.

According to the structure of the present embodiment, a beam waist is formed between the reflective surfaces before a fundamental laser beam is first reflected from one of the reflective surfaces. It is therefore possible to disperse many beam waist positions in a wide range in the wavelength conversion element 1305, which in turn realizes a wavelength conversion under stable conditions even with a high output power. The foregoing characteristic feature that a wavelength conversion is performed also before the laser beam is first reflected from one of the reflective surfaces (the first concave mirror 1303), offers an effect that by monitoring the laser beam subjected to the wavelength conversion in the first pass in the wavelength conversion element, it is possible to adjust the wavelength-converted beams independently of the reflective surfaces, which makes it possible to manufacture a compact wavelength conversion laser device. Furthermore, the foregoing characteristic feature offers another effect that the total conversion efficiency can be improved.

In the present embodiment, spherical concave mirrors are used as the two reflective surfaces. It should be appreciated, however, that spherical or flat reflective surfaces could be used as well. At least one of the two reflective surfaces has a curvature to bend the beam path of a laser beam, so that the laser beam reciprocates between the reflective surfaces plural times and the beam waists of the laser beam are formed between the reflective surfaces. A combination of two reflective surfaces can be designed freely. It is sufficient to allow a laser beam to enter into the wavelength conversion element provided between the two reflective surfaces at two incident angles, at least, by reflecting the laser beam from the two reflective surfaces plural times.

At least one of the two reflective surfaces transmits wavelength-converted laser beams so as to output the wavelength-converted laser beams. In the present embodiment, the first concave mirror 1303 transmits wavelength-converted second harmonic waves. The first concave mirror 1303 reflects the fundamental laser beam (wavelength: 1064 nm) at reflectance of 99.5% and transmits the second harmonic laser beam (wavelength: 532 nm) at transmittance of 99%. The second concave mirror 1304 reflects both the fundamental laser beam and the second harmonic laser beam at reflectance of 99.5% for the fundamental wave (1064 nm) and at reflectance of 99% for the second harmonic wave (532 nm). It is preferable that the reflective surface has higher reflectance for the laser beam (fundamental wave) because a loss is lessened. It may be configured in such a manner that both of the two reflective surfaces transmit the wavelength-converted laser beams or only one reflective surface transmits the wavelength-converted laser beams.

In the present embodiment, $MgO:LiNbO_3$ (periodically poled lithium niobate, abbreviated as PPLN) having the poled structure is used as the wavelength conversion element 1305, and it is of a rectangular prism shape (length: 26 mm, width: 10 mm, and thickness: 1 mm). The wavelength conversion element 1305 is made of a nonlinear optical crystal capable of performing wavelength conversion. For example, nonlinear optical crystals, such as KTP, LBO, CLBO, and LT, can be used as the wavelength conversion element 1305. In particular, because the wavelength conversion element 1305 having the poled structure and performing pseudo phase matching can form different phase matching conditions within the same frequency conversion element depending on the poling periods, it is preferable to use the wavelength conversion element 1305 in the wavelength conversion laser device of the present embodiment. As described, by having different phase matching conditions in the same frequency conversion element, it is possible to realize wider tolerance ranges for the temperature or the wavelength as the overall wavelength conversion laser device.

The wavelength conversion element 1305 of the present embodiment is disposed so as to have an incident surface perpendicular to the principal ray axis ML. The poled structure in the wavelength conversion element 1305 is formed at periods parallel to the incident surface, and the poling period is about 7 μm. The poling period described above is not necessarily the same in the frequency conversion element, and the poled structure may be formed by changing the period or the direction. An AR (Anti Reflection) coating for the laser beam (fundamental wave) and the wavelength-converted laser beam (second harmonic wave) is applied on the incident and emitting surfaces of the wavelength conversion element 1305. In order to avoid unnecessary reflection between the reflective surfaces, it is preferable to form the AR coating for the laser beam and the wavelength-converted laser beam on the wavelength conversion element 1305 in this manner.

In the wavelength conversion laser light source device 1300, the maximum angle θ of the fundamental laser beam with respect to the poling period is 3 degrees. The wavelength conversion laser light source device 1300 is a preferable embodiment in which let λ be the center wavelength of the fundamental laser beam and Δλ, be the spectrum full width at half maximum of the fundamental laser beam, then a relation expressed as below is established in order to convert the wavelength component of the fundamental laser beam entering into the wavelength conversion element 1305:

$$\cos\theta \leq \lambda/(\lambda+\Delta\lambda/2) \qquad (6).$$

The wavelength conversion laser light source device 1300 of the present embodiment performs wavelength conversion in a wide bandwidth by changing the angle of the fundamental laser beam with respect to the poling period of the wavelength conversion element 1305. However, by configuring in such a manner that the angle of the fundamental laser beam changes within the range to satisfy the relation expressed by the above expression (6), it is possible to convert the wavelength width across the entire region of the fundamental laser beam entering into the wavelength conversion element 1305. By satisfying the above expression (6), it becomes possible to widen the bandwidth of the wavelength-converted laser beam in a manner so as to suit to the laser light source.

Figure 13C:
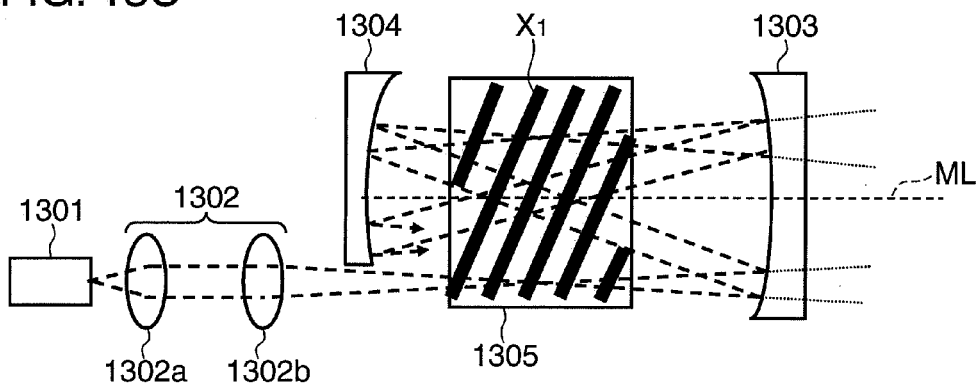

As shown in FIG. 13C, the wavelength conversion element 1305 is made of a nonlinear optical crystal having the poled structure, and the poled structure $X_1$ is formed so as to incline with respect to the principal ray axis ML, which is an optical axis linking the centers of the two reflective surfaces. A fundamental laser beam repetitively enters into the wavelength conversion element 1305 while changing an incident angle at the wavelength conversion element 1305. Changing the incident angle of the fundamental laser beam into the wavelength conversion element 1305 having the poled structure $X_1$ means that the poling period changes with the incident angle.

Incidentally, in a case where the poled structure $X_1$ is parallel to the incident plane in the wavelength conversion element, the poling period becomes longer in response to the absolute value of the incident angle of the fundamental laser beam. Accordingly, in the present embodiment, a variable range of the phase matching conditions is a range of the incident angle from 0 degree to 5.7 degrees, which is the maximum incident angle.

When the fundamental laser beam is reflected from the two reflective surfaces plural times, the incident angle of the fundamental laser beam into the wavelength conversion element varies within almost the same range in both the plus direction and the minus direction. As shown in FIG. 13C, by inclining the poled structure $X_1$ with respect to the principal ray axis ML, a change of the poling period caused by a pass of a laser beam can be comparable to a sum of the incident angle and the angle of inclination of the poled structure.

The structure shown in FIG. 13C is a preferable structure embodiment wherein a variable range of the phase matching conditions can be widened by forming the poled structure $X_1$ so as to incline with respect to the principal ray axis ML. By inclining the poled structure $X_1$ with respect to the principal ray axis ML, still wider tolerance ranges of the wavelength conversion laser device can be realized for temperatures and wavelengths of the fundamental laser beam. It is therefore possible to obtain wavelength-converted laser beams that are stable against environmental changes.

In particular, by providing the poled structure at or greater than the angle of the laser beam in the wavelength conversion element when the incident angle of the fundamental laser beam is the maximum, a variable range of the phase matching conditions can be about two times the range of the first embodiment above. The present embodiment is therefore a preferable embodiment to fully utilize a change of the incident angle. In order to incline the poled structure from the principal ray axis ML, it may be configured in such a manner that the wavelength conversion element itself is inclined from the principal ray axis ML.

In the present embodiment, the first concave mirror 1303 has the effective diameter of ϕ5 mm, the second concave mirror 1304 has the effective diameter of ϕ4 mm, the width in which the laser beam reciprocates in the wavelength conversion element 1305 is 5 mm, and the wavelength conversion laser device is of a compact elongate shape, from which high-power wavelength-converted laser beams can be outputted in a stable manner. The present embodiment is a preferable embodiment in which the fundamental laser beam going incident on the first concave mirror 3 has the beam diameter of ϕ0.3 mm and the beam diameter of the fundamental laser beam injected between the reflective surfaces is ⅕ or less of the effective diameter of the reflective surface (second concave mirror) 1304 that is one of the two reflective surfaces having the smaller effective diameter. Because the beam diameter of the fundamental laser beam injected between the reflective surfaces is sufficiently small for the effective diameters of the reflective surfaces, not only can overlapping of the fundamental laser beam between the reflective surfaces be relaxed, but also the number of reciprocation times of the laser beam between the reflective surfaces can be increased. Owing to relaxation of overlapping and an increase of the number of reciprocation times as above, the wavelength conversion laser device of the first embodiment can be compact yet capable of achieving both a high output and high conversion efficiency. It should be noted that when the diameter of an incident beam is made larger than ⅕ of the effective diameter of the reflective surface in the structure of the first embodiment, the number of reciprocation times between the reflective surfaces is reduced to about three and the conversion efficiency is lowered.

In the present embodiment, the center wavelength λ of the fundamental laser beam emitted from the fundamental laser light source 1301 is 1064 nm, the spectrum full width at half maximum Δλ is 0.1 nm, and the coherence length ($\lambda^2/\Delta\lambda$) is 11.3 mm. Because the distance D between the reflective surfaces is set to 58.4 mm, the coherence length of the laser beam is less than twice the distance between the reflective surfaces. The present embodiment has a preferable feature in that the coherence length of the fundamental laser beam is less than two times the distance between the reflective surfaces. If the coherence length of the laser beam is set two or more times the distance between the reflective surfaces, an interference is likely occur at overlapping points of the laser beams reciprocating between the reflective surfaces, which raises problems associated with the breaking of the wavelength conversion element and the instability of wavelength conversion at a point caused by the interference at which the beam intensity is high. The present embodiment solves a problem of coherence by making the coherence length of the fundamental laser beam reciprocating between the reflective surfaces shorter than the reciprocating distance.

Here, as is clear from FIG. 13B, the beam path moves gradually from the outside to the inside of the wavelength conversion element 1305 in the widthwise direction. As explained earlier, the temperature of the beam path rises by absorbing the generated harmonic wave when the wavelength conversion element 1305 performs wavelength conversion. The harmonic wave generated in the present embodiment becomes smaller to the outside and larger to the inside in the widthwise direction of the wavelength conversion element 1305. Therefore, the present embodiment, it is preferable to arrange such that the temperature of the beam pass in the output part within the wavelength conversion element 1305 is set relatively low, while the temperature of the beam pass in the inner part within the element 1305 is set relatively high. In the present embodiment, by using the induction heating method as a temperature retention mechanism of the wavelength conversion element 1305, the temperature gradient is formed between the outer part and the inner part of the wavelength conversion element 1305.

Figure 15A:
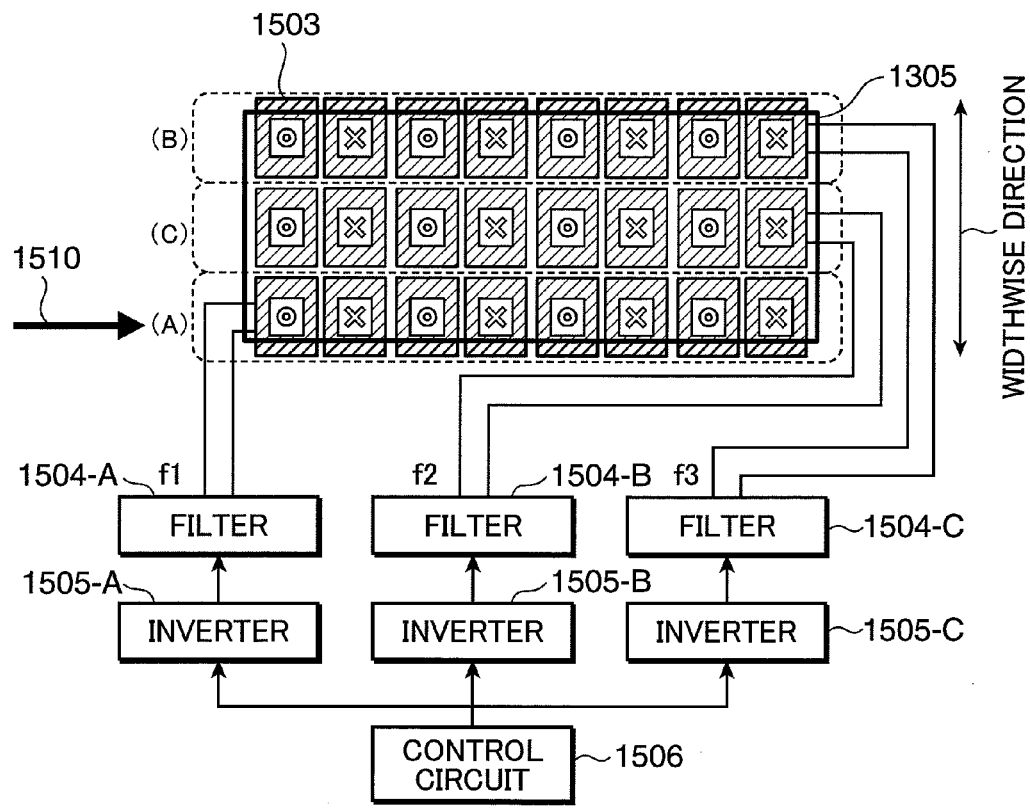
FIG. 15A is a plan view schematically showing the structure of a temperature holding mechanism of the wavelength conversion element in accordance with the wavelength conversion laser light source of FIG. 13A when adopting the heat induction method.
Figure 15B:
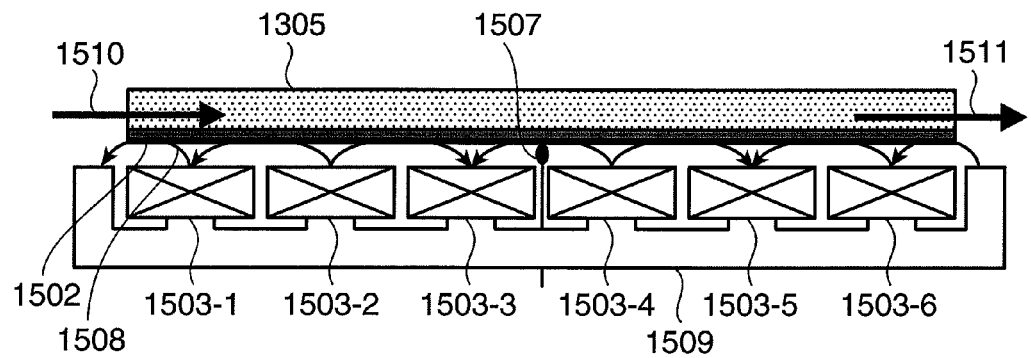
FIG. 15B is a side view schematically showing the structure of a temperature holding mechanism of the wavelength conversion element in accordance with the wavelength conversion laser light source of FIG. 13A when adopting the heat induction method.

FIG. 15A and FIG. 15B show schematic structures of one example of the present embodiment. FIG. 15A is a plan view and FIG. 15B is a side view. An arrow 1510 of FIG. 15A shows the direction of the fundamental wave incident into the wavelength conversion element 1305. A magnetic metal 1502 such as nickels is deposited to the bottom surface of the wavelength conversion element 1305 via the insulating material. The wavelength conversion element 1305 is provided above the pump coil 1503, and the magnetic flux 1508 generated from the pump coil 1503 concentrates on magnetic metal 1502 deposited to the bottom surface of the wavelength conversion element 1305 via the insulating material. As shown in FIG. 15A, the wavelength conversion element 1305 includes a plurality of regions (regions A, B and C) divided in the lengthwise direction from one end to the other in the widthwise direction. The pump coils 1503 are provided so as to independently heat respective regions (A), (B) and (C) of the wavelength conversion element 1305. These pump coils 1503 are driven with different frequencies for respective regions. The region (A) and the region (C) are outer regions in the widthwise direction of the wavelength conversion element 1305, and the region (B) is the inner region in the widthwise direction of the wavelength conversion element 1305. Here, the region A is provided on the light incident side, and the region C is provided on the other side.

As shown in FIG. 15B, the pump coils 1503 are held by the divided coil holders 1509 to form a magnetic circuit for each of the regions (A), (B), and (C). Each region has independent inverter circuit 1505 (1505-A to 1504-C) (high frequency power supply) respectively, and is controlled with the single controlling circuit 1506. In order to avoid the influence of the magnetic flux that leaks from the adjacent pump coil, the band-pass filter 1504 (1504-A to 1504-C), that cuts a bandwidth other than the frequency with which the pump coil for each region is driven, is provided between the inverter circuit 1505 and the pump coil 1503.

In the structure of FIG. 13A, wherein the first concave mirror 1303 and the second concave mirror 1304 are disposed so as to face one another, and the wavelength conversion element 1305 is provided between the first concave mirror 1303 and the second concave mirror 1304, it is preferable that the respective temperature set values TA, TB and TC of the regions (A), (B), and (C) to satisfy the condition of TA≦TB<TC. It is preferable that the condition of TA≦TB be satisfied because the region (A) provided on the fundamental wave incident side absorbs the generated harmonic wave more than the region (C), and is heated more than the region (C). The difference in temperature between TB and TC is around 0.2° C. to 1° C., and such difference in temperature can be formed by the difference in driving frequency. Since the regions (A), (B), and (C) are controlled independently, it is possible to control the respective regions using the algorithm shown in FIG. 4B.

Figure 16:
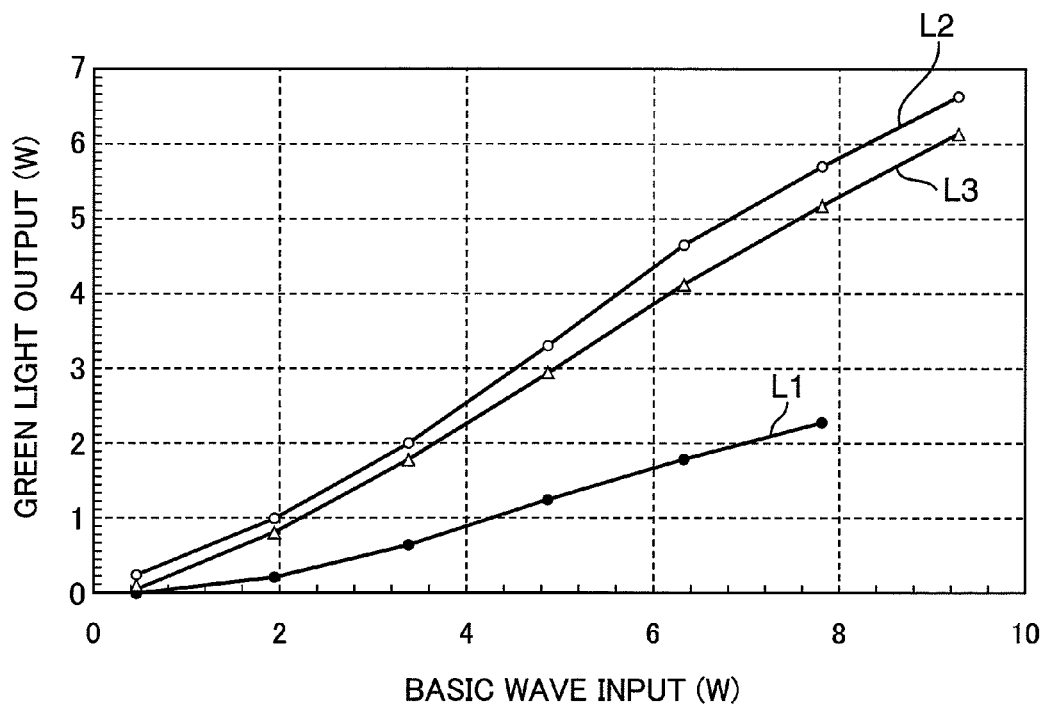
FIG. 16 is a plot diagram that shows the relation between the fundamental wave input and the harmonic wave (green light) output power.

FIG. 16 is a plot diagram that shows the relation between the fundamental wave input and the harmonic wave (green light) output power when the harmonic wave is actually generated with the foregoing structure. In the graph of FIG. 16, L1 denotes total conversion efficiency in the case of carrying out the wavelength conversion using a single pass, L2 denotes the conversion efficiency when carrying out the temperature control with divided regions of the wavelength conversion element 1305 with the structure of the present embodiment wherein the fundamental wave reciprocates, and L3 denotes the conversion efficiency without carrying out the temperature control with divided regions. According to the structure of the present embodiment wherein the fundamental wave beam reciprocates, two to two and a half times as high as the green light output power can be obtained as compared with the case of the single pass (comparison between L1 and L2·L3). Furthermore, it was found that by dividing the wavelength conversion element 1305 into the region (A), (B), and (C) so that the temperature control can be performed for each region, it is possible to increase the output power by 10% to 20% (comparison between L2 and L3).

Incidentally, the other parts of the wavelength conversion element 1305 can be prevented from being undesirably heated by the magnetic flux extending to the other parts of the wavelength conversion element 1305 as in the case of the first and second embodiments. Therefore, it is preferable that the surroundings of the pump coil that surrounds the wavelength conversion element 1305 are covered with a non-magnetic metal (non-magnetic conductor).

For the structure of the side face of the wavelength conversion element 1305 (the faces other than the light incident and output face), the magnetic metal is deposited on the face to be heated via the insulating material; however, it is preferable that the other three faces are covered with a non-magnetic conductor via the insulating material. Moreover, it was also found that the following effects can be achieved by using the temperature retention mechanism of the wavelength conversion element adopting the high frequency induction heating method of the first embodiment to the third embodiment of the present invention. Namely, in the case of adopting a heater or a Peltier device, the wavelength conversion element and the holder are generally fixed using a thermally conductive adhesive. However, when fixing the wavelength conversion element and the holder using a thermally conductive adhesive, due to stress and release, etc. at the interface between the adhesive and the wavelength conversion element, a problem arises in that the phase matching temperature of the wavelength conversion element changes as time passes. According to the temperature holding structure of the present embodiment, however, since the heating unit is deposited directly to the wavelength conversion element, the thermal conductivity of the wavelength conversion element and the holder need not be considered. Namely, the wavelength conversion element of the present embodiment is held only mechanically by the holder of the wavelength conversion element, without requiring a strong adhesive. As a result, it is possible to suppress changes in phase matching temperature of the wavelength conversion element as time passes. Moreover, a breakdown of the wavelength conversion element etc. is not liable to occur even if the element is subjected to a rapid temperature rise each time the device is started, and physical reliability therefore improves as well.

Furthermore, by providing the layer of a insulating material with a resistivity of not less than $1 \times 10^8 \Omega \cdot cm$, preferably not less than $2 \times 10^{11} \Omega \cdot cm$ between the wavelength conversion element (non-linear optical crystal) and the magnetic metals that severer as the heating units, as explained with reference to FIG. 7, it is possible to suppress an increase in the optical absorption amount generated when the wavelength conversion element is heated and cooled, and to avoid a breakdown of the wavelength conversion element due to absorption of heat.

Figure 17:
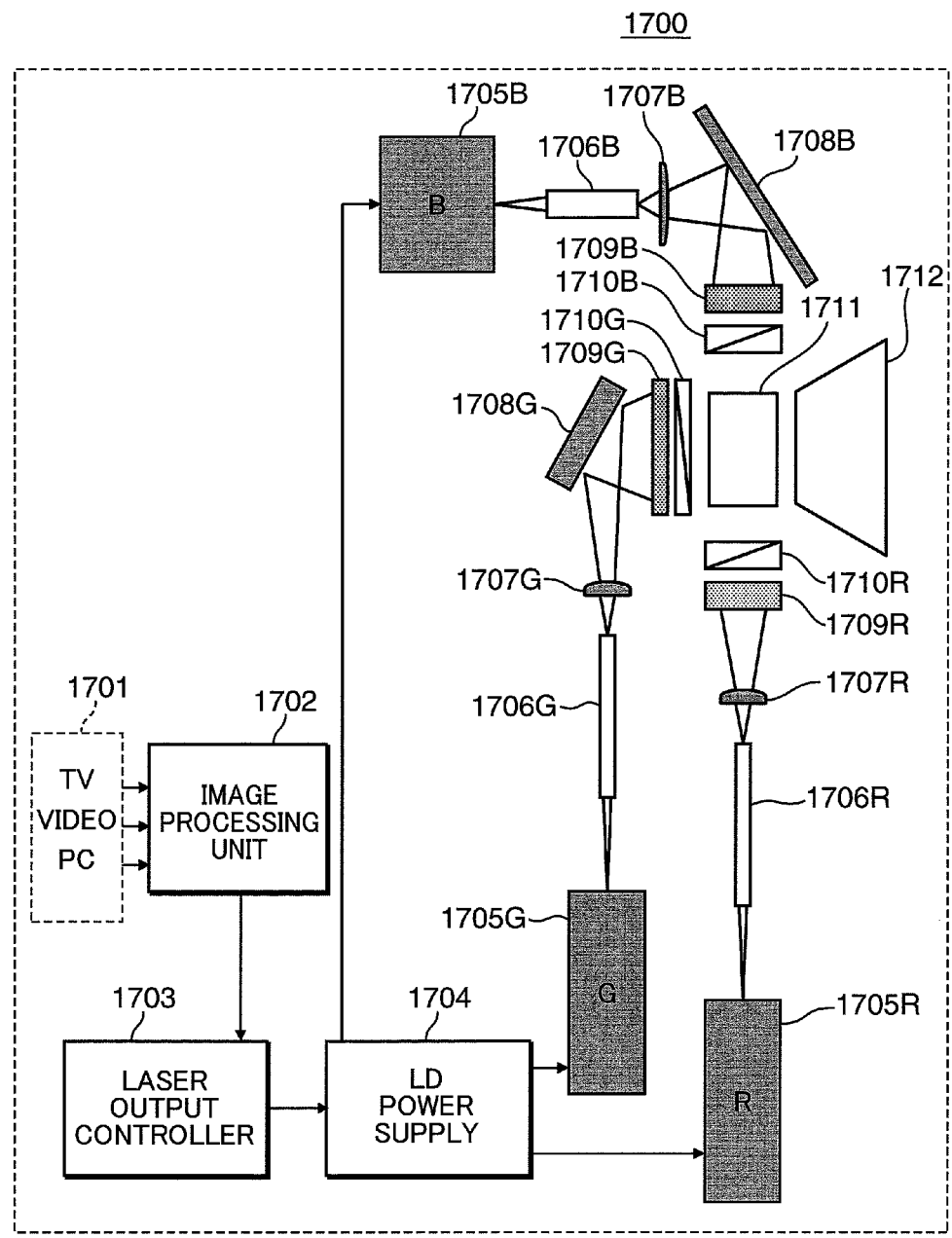
FIG. 17 is an explanatory view schematically showing the structure of a projector (projection display) adopting a laser light source in accordance with still another embodiment of the present invention.
Figure 18A:
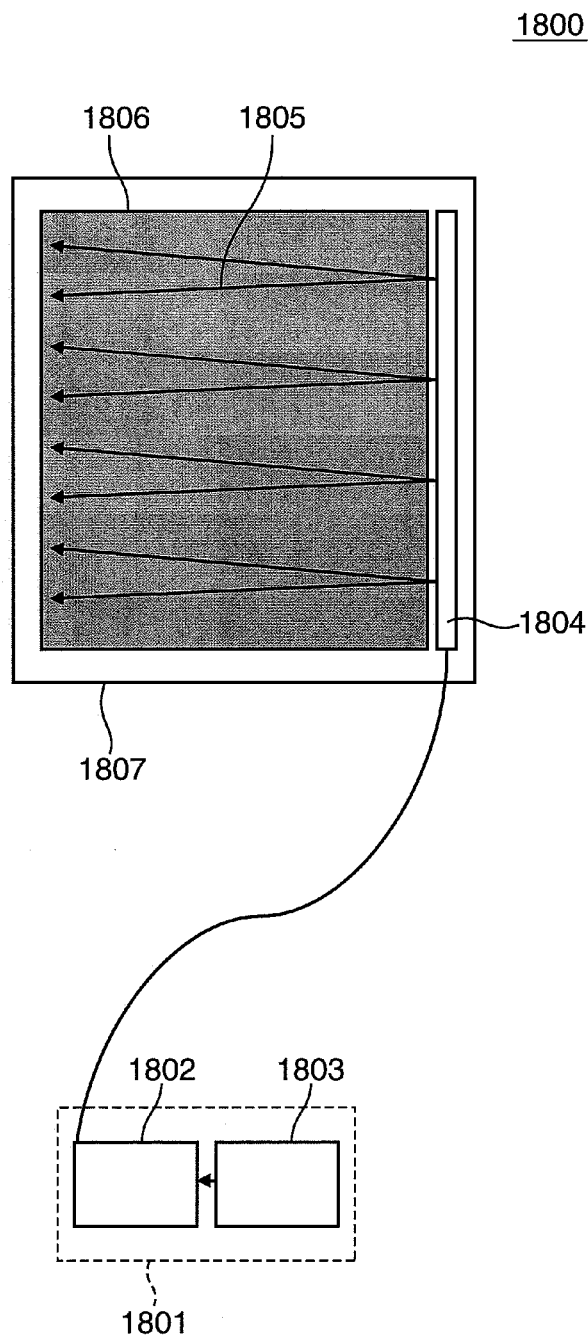
FIG. 18A is an explanatory view schematically showing an example structure of a liquid crystal display adopting a laser light source of the present invention.
Figure 18B:
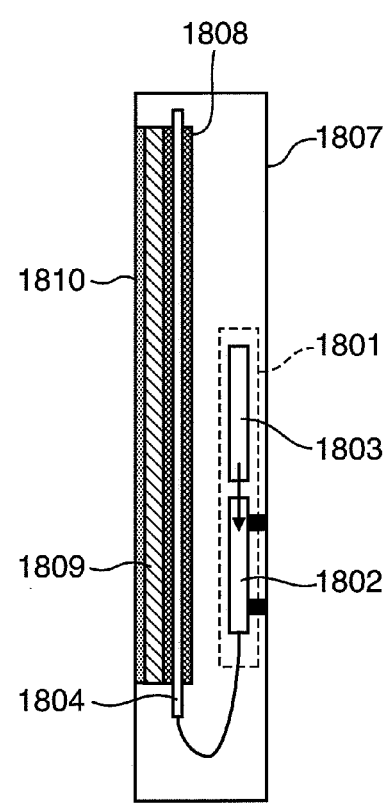
FIG. 18B is a cross-sectional view of the liquid crystal display of FIG. 18A.
Figure 19:
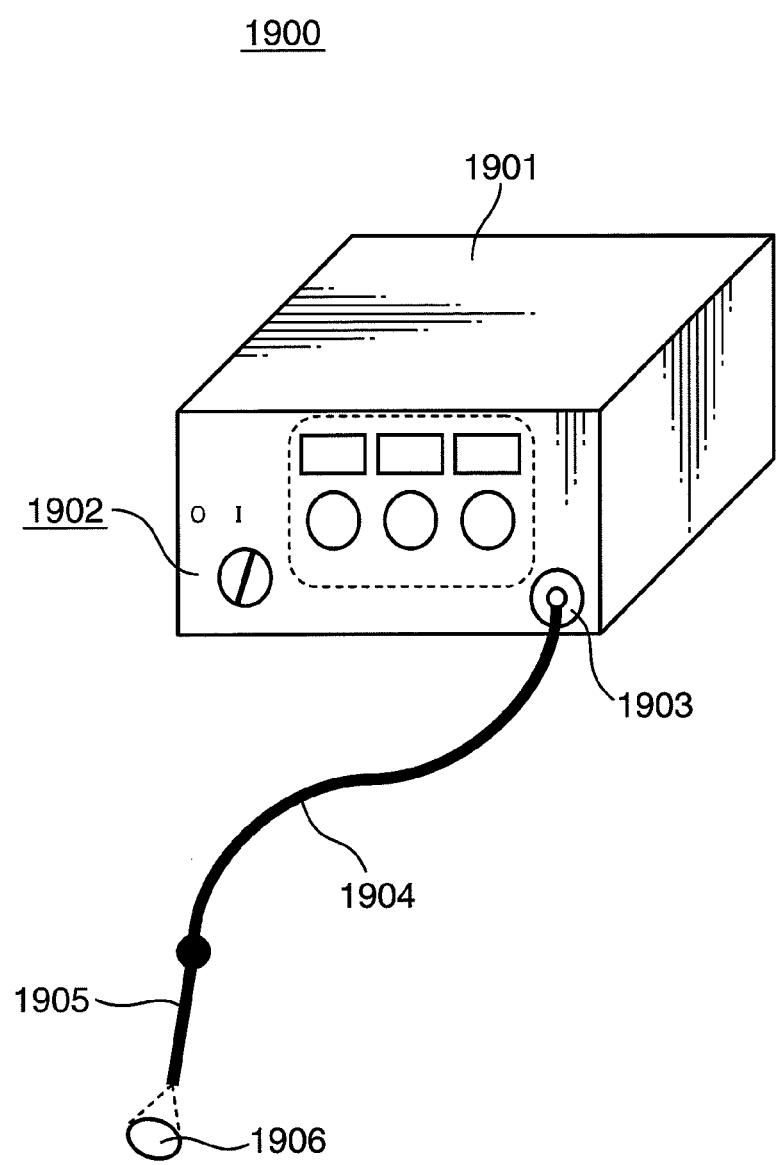
FIG. 19 is an explanatory view schematically showing an example structure of a laser light source provided with fiber adopting the laser light source of the present invention.

FIG. 17, and FIGS. 18A and 18B show an example structure of a two-dimensional image display apparatus adopting the fiber laser light source in accordance with the present embodiment. FIG. 19 is an explanatory view schematically showing an example structure of a laser display (image display device) adopting the wavelength conversion laser light source in accordance with the first to third embodiments of the present invention One example structure of a laser display (image display apparatus) applied to the wavelength conversion module of the present embodiment will be explained in reference to FIG. 17. FIG. 17 schematically shows the structure of an optical engine of a projector system adopting a laser light source in accordance with the present embodiment.

The two-dimensional image display device 1700 in accordance with the present embodiment has an optical engine for a projector using 3 LCD panels. The two-dimensional image display device 1700 includes an image processing section 1702, a laser output controller (controller) 1703, an LD power supply 1704, red, green and blue laser light sources 1705R, 1705G, and 1705B, beam shape rod lens 1706R, 1706G, and 1706B, relay lens 1707R, 1707G and 1707B, reflecting mirrors 1708G and 1708B, two-dimensional modulation elements 1709R, 1709G and 1709B for displaying an image; polarizers 1710R, 1710G and 1710B, a combine prism 1711, and a projection lens 1712.

The green laser light source 1705G is controlled by the controller 1703 and the LD power supply 1704 which control an output from the green light source.

A laser beam emitted from each of the red, green and blue laser light sources 1705R, 1705G, and 1705B are formed in a rectangular shape by the beam shape rod lens 1706R, 1706G, and 1706B, and with which, the two-dimensional modulation element in each color is illuminated by the relay lens 1707R, 1707G, and 1707B. Further, two-dimensionally modulated images in respective colors are combined by the combine prism 1711, and the resulting image is projected onto the screen by the projection lens 1712, thereby displaying an image.

The green laser light source 1705G is arranged such that a laser resonator is housed in the fiber. With this structure, it is possible to suppress a reduction in output level and fluctuations in output power as time passes due to an increase in loss in the resonator by dust particles from the outside or a misalignment of the reflective surface.

On the other hand, in the image processing section 1702, a light amount control signal is generated for changing the output level of the laser beam according to the luminance information of the input image signal 1701, and transmits the light amount control signal to the laser output controller 1703. According to the foregoing image processing section 1702, a contrast can be improved by controlling the light amount according to the luminance information. In this case, the control method (PWM control) may be adopted, wherein an average light amount is changed by pulse driving the laser beam to change the duty ratio (ON time)/(ON time+OFF time) for the ON time of the laser.

The green light source adopted in this projection system may be arranged so as to emit a Green laser beam having a wavelength in a range of from 510 nm to 550 nm. With this structure, it is possible to obtain an output laser beam in Green color of high spectral luminous, thereby realizing a display with a desirable color reproducibility, which can display an image in color close to an original color.

Specifically, the two-dimensional image display device of the present invention includes a screen, a plurality of laser light sources, a scanning section for scanning the laser light sources, wherein the laser light sources include at least laser sources which emit a red color laser beam, a green color laser beam, and a blue color laser beam; and at least the green color light source is provided with the wavelength conversion element having any of the foregoing first to third embodiments.

With the foregoing structure, an output laser beam in Green color of high spectral luminous can be obtained. It is therefore possible to realize a color still closer to the original color with an application to a display with desirable color reproducibility.

For the two-dimensional image display device, those of a rear projection display type (FIG. 17), or of a front projection type may be adopted.

For the special modulation element, it is needless to mention that a two-dimensional modulation element of the transmission type liquid crystal or the reflective type liquid crystal, a galvanometer mirror, a DMD or other Micro Electro Mechanical System (MEMS) may be used.

When adopting the light modulation element which is less likely to be affected by polarization components with respect to the light modulation characteristics, such as the reflection-type special modulation element, the MEMS, the galvanometer mirror like the case of the present embodiment, it is not required to adopt a polarization-maintaining optical fiber such as a PANDA (polarization maintaining and absorption reducing) fiber for transmitting the harmonic wave with the optical fiber. On the other hand, when adopting a two-dimensional modulation device using liquid crystals, the modulation property and the polarization property are significantly affected. It is therefore desirable to adopt a polarization-maintaining optical fiber.

FIG. 18 shows one example structure of a display adopting the laser light source. A liquid crystal display 1800 includes, for example, a laser light source 1802, a control unit 1803, a light guide member 1804 for converting the laser light source from a point light source to a linear light source, a light guide plate 1808 for converting the linear light source into a planar light source to be projected onto the entire liquid crystal panel, a polarization plate/diffusion member 1809 for aligning the polarization direction or removing the non-uniform illumination, and a liquid crystal panel 1810, etc. Namely, the light source of the present invention may be used as a backlight source for the liquid crystal display.

As shown FIG. 19, the laser device of the first to third embodiments of the present invention may be used as a laser light source 1900 for surgical operations, which is made up of, for example, a laser light source, a control unit for controlling the output from the laser light source, an output setting device 1902 for setting an output level, an output connector 1903 for outputting a laser from a laser light source, a delivery fiber 1904 for guiding the laser beam to a desired area to be irradiated with, and a hand peace 1905, etc.

As described, the wavelength conversion laser light source, according to one aspect of the present invention includes: a fundamental wave laser light source; a wavelength conversion element for converting a fundamental wave emitted from the fundamental wave laser light source into a harmonic wave; and an element temperature holding section for holding the wavelength conversion element at a temperature as set, wherein the element temperature holding section includes a magnetic metal formed on at least a part of the surface of the wavelength conversion element via an insulating material, and a magnetic flux application section for heating the magnetic metal with an application of a magnetic flux to the magnetic metal.

According to the foregoing structure, the magnetic metal is formed on the surface of the wavelength conversion element. With this structure, by applying a magnetic flux from the magnetic flux application section onto the magnetic metal, eddy current is generated on the surface of the magnetic metal by the electromagnetic induction. As a result, the magnetic metal serves as a heat source, and it becomes possible to rapidly heat the wavelength conversion element. Namely, according to the wavelength conversion laser light source of the present invention realizes a rapid temperature rise of the wavelength conversion element by adopting the induction heating method as compared to the conventional structure adopting a heater or a Peltier device. As a result, the time required for the wavelength conversion element to arrive to the target temperature can be reduced, which in turn realizes a rapid start up of the wavelength conversion laser light source. Furthermore, the insulating material is provided between the wavelength conversion element and the magnetic metal so that the magnetic metal does not directly contact the surface of the wavelength conversion element. With this structure, it is possible to suppress the absorption of the fundamental wave, thereby improving the transmittance of the fundamental wave.

The foregoing structure is preferably arranged such that the insulating material is a material having resistivity of not less than $1 \times 10^8$ $\Omega \cdot$cm.

The foregoing structure is preferably arranged such that the magnetic flux application section includes a pump coil to be excited with a high frequency current, and a control section for controlling the high frequency current to be supplied to the pump coil; and the control section controls a rate of a temperature rise of the wavelength conversion element by adjusting a frequency of the high frequency current to be supplied to the pump coil.

According to the foregoing structure, the rate of a temperature rise of the wavelength conversion element is controlled by adjusting the frequency of the high frequency current to be supplied to the pump coil. With this structure, it is possible to control the rate of the temperature rise, for example, by setting, in the initial stage of heating the wavelength conversion element, the frequency of the high frequency current slightly higher to rapidly increase the temperature of the element to realize a steep temperature rise, and setting, as the temperature reaches the target temperature, the frequency of the high frequency current slightly lower to reduce an amount of heat generated from the wavelength conversion element to realize a small amount of overshooting at the same time.

The foregoing structure is preferably arranged such that the control section controls a temperature of the wavelength conversion element by carrying out a pulse width modulation control on the high frequency current to be supplied to the pump coil.

According to the foregoing structure, the high frequency current to be supplied to the pump coil is PWM controlled in the induction heating method. It is therefore possible to carry out fine adjustments of the temperature of the wavelength conversion element, for example, when it is almost heated to the target temperature.

The foregoing structure is preferably arranged such that the element temperature holding section further includes a temperature sensor for detecting a temperature of the wavelength conversion element, and the control section controls the high frequency current to be supplied to the pump coil based on a temperature of the wavelength conversion element detected by the temperature sensor.

According to the foregoing structure, the high frequency current to be supplied to the pump coil is controlled based on the temperature as detected, while monitoring the temperature of the wavelength conversion element by the temperature sensor. It is therefore possible to precisely control the temperature of the wavelength conversion element in the induction heating method.

The foregoing structure is preferably arranged such that the control section includes a filter for removing high frequency noise generated by the high frequency current, which is superimposed on a detection signal of the temperature sensor.

According to the foregoing structure, the high frequency noise superimposed on a detection signal of the temperature sensor is removed by the filter. It is therefore possible to precisely control the temperature of the wavelength conversion element in the induction heating method.

The foregoing structure is preferably arranged such that the control section determines a frequency of the high frequency current to be supplied to the pump coil based on a coefficient G computed by the equation of:

$$G=(Tpv-T)/(Tsv-T)$$

wherein T indicates a temperature initial value T obtained by the temperature sensor, Tsv indicates a set temperature value of the wavelength conversion element, and Tpv indicates a temperature current value obtained by the temperature sensor.

With this structure, it is possible to control the rate of the temperature rise with ease, for example, by setting, in the initial stage of heating the wavelength conversion element where the coefficient G is small, the frequency of the high frequency current slightly higher to rapidly increase the temperature of the element to realize a steep temperature rise, and setting, as the temperature reaches the target temperature where the coefficient G becomes larger, the frequency of the high frequency current slightly lower to reduce an amount of heat generated from the wavelength conversion element.

The foregoing structure is preferably arranged such that the magnetic metal formed on the wavelength conversion element is divided into a plurality of regions from a fundamental wave incident side to an output side, and each of the plurality of regions is made of a different material.

According to the foregoing structure, by adopting a different material of the magnetic metal formed on the wavelength conversion element, for each region, it is possible to change an amount of heat generated by the electromagnetic induction for each region. Furthermore, by selecting different materials of the magnetic metal for respective divided regions of the wavelength conversion element from the fundamental beam incident side to the output side, it is possible to suppress the extension of the temperature distribution of the beam pass in the wavelength conversion element due to the heat absorbed by the wavelength conversion element. As a result, it is possible to improve the conversion efficiency of the wavelength conversion element.

The foregoing structure is preferably arranged such that the pump coil is divided into a plurality of regions from a fundamental wave incident side to an output side, and the control section excites each of the plurality of regions of the pump coil with a high frequency current of different frequency.

According to the foregoing structure, the pump coil is divided into a plurality of regions from the fundamental wave incident side to the output side, and each region of the pump coil is excited with a high frequency current of a different frequency, it is possible to carry out a fine adjustment for each region. It is therefore possible to significantly suppress the extension of the temperature distribution of the beam pass in the wavelength conversion element due to the heat absorbed by the wavelength conversion element. As a result, a still higher conversion efficiency of the wavelength conversion element can be realized.

The foregoing structure is preferably arranged such that a non-magnetic conductor provided so as to cover surroundings of the magnetic flux application section.

According to the foregoing structure, the parts other than the magnetic metal formed on the wavelength conversion element can be prevented from being undesirably heated by magnetic flux extending to the other parts.

The foregoing structure is preferably arranged such that the wavelength conversion element is made of $LiNbO_3$ or $LiTaO_3$ having a periodical polarization inversion structure or a crystal of $LiNbO_3$ or $LiTaO_3$ having added thereto an additive.

For the material of the wavelength conversion element, $LiNbO_3$ or $LiTaO_3$ having a periodical polarization inversion structure or a crystal of $LiNbO_3$ or $LiTaO_3$ having added thereto an additive is preferable as such non-linear optical crystals have a large non-linear optical effect.

The foregoing structure is preferably arranged so as to further include: two reflective surfaces for reflecting therefrom the fundamental wave; and condensing optics for condensing the laser beams to be injected between the two reflective surfaces, wherein at least one of the two reflective surfaces has a curvature for reflecting a laser beam to be re-injected into the wavelength conversion element between the two reflective surfaces repeatedly while forming multi paths of laser beams injected into the wavelength conversion element at different incident angles, and the condensing optics are arranged to disperse beam waists of the laser beams in the wavelength conversion element, which reciprocate between the two reflective surfaces.

According to the foregoing structure, the wavelength conversion element is disposed between the two reflective surfaces at least one of which has a curvature, so that the laser beam reciprocates between the reflective surfaces plural times by changing the incident angle at the wavelength conversion element. The phase matching condition therefore changes by passes of the laser beam into the wavelength conversion element. The wavelength conversion laser device therefore has a plurality of phase matching conditions, even when a phase matching condition is shifted by a given pass, the phase matching conditions will match by other passes. It is therefore possible to compensate for deterioration of the conversion efficiency. As a result, wavelength converted laser beams can be obtained under stable conditions against environmental changes by realizing wider tolerance ranges for the phase matching conditions, such as temperatures and wavelengths, while maintaining high conversion efficiency. Additionally, low coherent wavelength-converted beams that perform laser oscillation with a wide spectrum width can be obtained. Further, by dispersing the beam waist positions of the laser beams within the wavelength conversion element by the condensing optics, it is possible to obtain high-output wavelength-converted beams with which light-induced damage on the wavelength conversion element while eliminating a problem with regard to the instability of wavelength conversion.

According to the foregoing structure, it is possible to realize a wavelength conversion laser device which is capable of obtaining high conversion efficiency and a stable high-output emission while outputting low coherent wavelength-converted beams with reduced speckle noises.

The foregoing structure is preferably arranged such that the condensing optics condenses the fundamental wave so that a beam waist of the fundamental wave is formed in the wavelength conversion element before being first reflected from either one of the two reflective surfaces.

According to the foregoing structure, the beam waist positions can be dispersed to many points over a wide range within the wavelength conversion element by forming a beam waist between the reflective surfaces before the laser beam is first reflected from one of the reflective surfaces. It is therefore possible to perform wavelength conversion under stable conditions even with a high output. Furthermore, the foregoing characteristic feature offers the effect of improving the total conversion efficiency.

The foregoing structure is preferably arranged such that the wavelength conversion element has a periodically poled structure; and given that an optical axis linking respective centers of the two reflective surfaces is a principal ray axis, then the periodically poled structure is inclined with respect to the principal ray axis.

According to the foregoing structure, it is possible to obtain wavelength-converted beams under stable conditions against environmental changes or the like by realizing wider tolerance ranges for the phase matching conditions, such as temperatures or the like.

The foregoing structure is preferably arranged such that the wavelength conversion element has a periodically poled structure, and the following relationship holds:

$$\cos\theta \leq \lambda/(\lambda+\Delta\lambda/2)$$

wherein $\theta$ indicates a maximum angle of the laser beam with respect to a poling period when the laser beam passes through the wavelength conversion element, $\lambda$ indicates a center wavelength of the laser beam, and $\Delta\lambda$ indicates a spectrum full width at half maximum of the laser beam.

According to the foregoing structure, wavelength conversion in a wide bandwidth is performed as the angle of the laser beam with respect to the poling period of the wavelength conversion element changes. Herein, by arranging such that the angle of the laser beam changes within the range satisfying the above expression, it becomes possible to convert the wavelength width in the entire range of the laser beam entering into the wavelength conversion element. In other words, by satisfying the above expression, the bandwidth of the wavelength-converted beam can be widened through the wavelength conversion suitable to a laser beam that the laser light source outputs.

The foregoing structure is preferably arranged such that the following relationship holds:

$$f1+f2<D<f1+f2+L,$$

wherein D indicates a distance between the two reflective surfaces, f1 and f2 respective indicate focal lengths of the two reflective surfaces, and L indicates a length of the wavelength conversion element.

By setting the distance D between the reflective surfaces to satisfy the above expression, it becomes close to the confocal alignment of the two reflective surfaces and the laser beam passes through the wavelength conversion element many more times as the number of reciprocation times of the beam pass increases. As a result, the total conversion efficiency from the fundamental wave into wavelength-converted beams can be improved.

The foregoing structure is preferably arranged such that the magnetic flux application section includes a pump coil that is excited with a high frequency current, and a control section for controlling a high frequency current to be supplied to the pump coil; the wavelength conversion element is divided into a plurality of regions from one end to the other end in a widthwise direction; a plurality of pump coils are provided so that each of the plurality of regions of the wavelength conversion element can be heated independently from one another; and a control section for controlling a high frequency current to be supplied to the pump coil includes a plurality of high frequency power supplies for respectively supplying high frequency currents having frequencies to the plurality of pump coils respectively corresponding to the plurality of regions independently from one another.

According to the structure wherein the fundamental wave reciprocates a plurality of times between the reflective surfaces, the beam pass is gradually shifted from the outer side to the inner side in the widthwise direction of the wavelength conversion element. When carrying out the wavelength conversion by the wavelength conversion element, the beam pass in the wavelength conversion element may be heated as the wavelength conversion element absorbs the wavelength converted light. Generally, the wavelength converted light has a larger power on the outer side and smaller power on the inner side in the widthwise direction of the wavelength conversion element.

According to the foregoing structure wherein the wavelength conversion element is divided into a plurality of regions from one end to the other end in the widthwise direction, so that the plurality of the pump coils can respectively heat the divided regions of the wavelength conversion element, it is possible to suppress the extension of the temperature distribution of the beam pass in the wavelength conversion element due to the heat absorbed by the wavelength conversion element. As a result, it is possible to improve the conversion efficiency of the wavelength conversion element.

The foregoing structure is preferably arranged so as to further include: a band filter for cutting other bandwidth than the frequency of the high frequency current generated by each of the high frequency power supplies, the band filter being provided between each of the high frequency power supplies and the excitation coil.

According to the structure wherein the excitation coil for each divided region is excited by a high frequency current of different frequency, signals returned to each high frequency power supply increase due to the magnetic flux generated by the pump coil, which may cause electrical interference. In response, by inserting the band filter between each of the high frequency power supplies and the excitation coil, for cutting other bandwidth than the frequency of the high frequency current generated by each of the high frequency power supplies, it is possible to prevent such electrical interference.

As described, the two-dimensional image display device according to one aspect of the present invention includes: a wavelength conversion laser light source of any of the foregoing structures; a two-dimensional modulation element that two-dimensionally modulates an output beam from the wavelength conversion laser light source; and a projection lens that projects the output beam from the two-dimensional modulation element.

According to the foregoing structure, it is possible to realize a projection-type two-dimensional image display device adopting the wavelength conversion laser light source, which reduces a time required for a wavelength conversion element to arrive to a target temperature, and a shorter start-up time.

The two-dimensional image display device according to another aspect of the present invention includes: a light source unit including the wavelength conversion laser light source of any of the foregoing structures; and a liquid crystal panel that emits the output light from the light source unit.

According to the foregoing structure, it is possible to realize a liquid crystal panel-type two-dimensional image display device adopting the wavelength conversion laser light source, which reduces a time required for a wavelength conversion element to arrive to a target temperature, and a shorter start-up time.

The laser light source device according to one aspect of the present invention includes: the wavelength conversion laser light source of any of the foregoing structure; and a fiber for guiding the harmonic wave outputted from the wavelength conversion laser light source to an irradiation area.

According to the foregoing structure, it is possible to realize a laser light source device with a fiber, adopting the wavelength conversion laser light source, which reduces a time required for a wavelength conversion element to arrive to a target temperature, and a shorter start-up time.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A wavelength conversion laser light source comprising:
a fundamental wave laser light source;
a wavelength conversion element for converting a fundamental wave laser beam emitted from the fundamental wave laser light source into a harmonic wave; and
an element temperature holding section for holding the wavelength conversion element at a temperature as set,
two reflective surfaces for reflecting therefrom the fundamental wave laser beam; and
condensing optics for condensing the fundamental wave laser beam to be injected between said two reflective surfaces,
wherein the element temperature holding section includes a magnetic metal formed on at least a part of the surface of the wavelength conversion element via an insulating material, and a magnetic flux application section for heating the magnetic metal with an application of a magnetic flux to the magnetic metal,
wherein at least one of said two reflective surfaces has a curvature for reflecting the fundamental wave laser beam to be re-injected into the wavelength conversion element between said two reflective surfaces repeatedly while forming multi paths of the fundamental wave laser beam injected into the wavelength conversion element at different incident angles, and
wherein said condensing optics are arranged to disperse beam waists of the fundamental wave laser beam in the wavelength conversion element, which reciprocate between said two reflective surfaces.

2. The wavelength conversion laser light source according to claim 1, wherein:
said condensing optics condense the fundamental wave laser beam so that a beam waist of the fundamental wave laser beam is formed in the wavelength conversion element before being first reflected from either one of said two reflective surfaces.

3. The wavelength conversion laser light source according to claim 1, wherein:
the wavelength conversion element has a periodically poled structure; and
given that an optical axis linking respective centers of said two reflective surfaces is a principal ray axis, then said periodically poled structure is inclined with respect to the principal ray axis.

4. The wavelength conversion laser light source according to claim 1, wherein:
the wavelength conversion element has a periodically poled structure, and the following relationship holds:

$$\cos\theta \leq \lambda/(\lambda + \Delta\lambda/2)$$

wherein $\theta$ indicates a maximum angle of the fundamental wave laser beam with respect to a poling period when the fundamental wave laser beam passes through the wavelength conversion element, $\lambda$ indicates a center wavelength of the fundamental wave laser beam, and $\Delta\lambda$ indicates a spectrum full width at half maximum of the fundamental wave laser beam.

5. The wavelength conversion laser light source according to claim 1,
wherein the following relationship holds:

$$f1+f2 < D < f1+f2+L,$$

wherein D indicates a distance between the two reflective surfaces, f1 and f2 respective indicate focal lengths of the two reflective surfaces, and L indicates a length of the wavelength conversion element.

6. The wavelength conversion laser light source according to claim 1, wherein:
said magnetic flux application section includes a pump coil that is excited with a high frequency current, and a control section for controlling a high frequency current to be supplied to the pump coil;
the wavelength conversion element is divided into a plurality of regions from one end to the other end in a widthwise direction;
a plurality of pump coils are provided so that each of said plurality of regions of the wavelength conversion element can be heated independently from one another; and
a control section for controlling a high frequency current to be supplied to the pump coil includes a plurality of high frequency power supplies for respectively supplying high frequency currents having frequencies to the plurality of pump coils respectively corresponding to said plurality of regions independently from one another.

7. The wavelength conversion laser light source according to claim 6, further comprising:
a band filter for cutting other bandwidth than the frequency of the high frequency current generated by each of said high frequency power supplies, said band filter being provided between each of said high frequency power supplies and said excitation coil.

* * * * *